US011023831B2

(12) United States Patent
Farooq et al.

(10) Patent No.: US 11,023,831 B2
(45) Date of Patent: *Jun. 1, 2021

(54) OPTIMIZING A BUSINESS MODEL OF AN ENTERPRISE

(71) Applicant: International Business Machines Corporation, Armonk, NY (US)

(72) Inventors: Mohammed Farooq, Austin, TX (US); Raghunath Sapuram, Cedar Park, TX (US); Manish Modh, Cedar Park, TX (US); Robert Erickson, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,326

(22) Filed: Jan. 22, 2020

(65) Prior Publication Data

US 2020/0160237 A1    May 21, 2020

Related U.S. Application Data

(63) Continuation of application No. 16/505,786, filed on Jul. 9, 2019, now Pat. No. 10,592,828, which is a
(Continued)

(51) Int. Cl.
    *G06Q 10/06*      (2012.01)
    *G06Q 30/02*      (2012.01)
(52) U.S. Cl.
    CPC ......... *G06Q 10/06* (2013.01); *G06Q 30/0201* (2013.01)
(58) Field of Classification Search
    None
    See application file for complete search history.

(56) References Cited

U.S. PATENT DOCUMENTS 6,954,757 B2   10/2005  Zargham et al.
7,031,901 B2 *  4/2006  Abu El Ata ............ G06F 17/10
                                                    703/1
(Continued)

FOREIGN PATENT DOCUMENTS

JP      2003337697        11/2003
WO   WO-2004072823 A2 *  8/2004  ....... G06Q 10/06375
(Continued)

OTHER PUBLICATIONS

Abi, Issam, et al. "A business driven management framework for utility computing environments." (2004). (Year: 2004).*
(Continued)

*Primary Examiner* — Matthew S Gart
*Assistant Examiner* — Derick J Holzmacher
(74) *Attorney, Agent, or Firm* — Schmeiser, Olsen & Watts, LLP; Nicholas L. Cadmus

(57) ABSTRACT

A method and system for operating an enterprise via an optimized business model. An output benchmark value is generated. An initial benchmark value for a resource of an enterprise is updated based on the output benchmark value. The business model is updated. A process is iteratively performed based on the updated benchmark value and model, until the benchmark value is changed by less than a predetermined threshold to generate the optimized business model. The enterprise is operated in accordance with the optimized model which includes: generating performance measures of usage of a computer resource, dynamically displaying a dashboard of the performance measures, determining from the displayed performance measures that the computer resource is a current bottleneck or is likely to become a bottleneck in the near future, and optimizing the computer resource's usage using the displayed performance
(Continued)

measures to reduce data throughput delay and increase throughput of bottleneck operations.

20 Claims, 9 Drawing Sheets

Related U.S. Application Data continuation of application No. 16/114,337, filed on Aug. 28, 2018, now Pat. No. 10,395,189, which is a continuation of application No. 12/019,004, filed on Jan. 24, 2008, now Pat. No. 10,095,990.

(56) References Cited

U.S. PATENT DOCUMENTS

| | | | |
|---|---|---|---|
| 7,162,427 B1 | 1/2007 | Myrick et al. | |
| 10,095,990 B2 | 10/2018 | Farooq et al. | |
| 10,395,189 B2 | 8/2019 | Farooq et al. | |
| 2001/0053991 A1* | 12/2001 | Bonabeau | G06Q 10/06 705/7.17 |
| 2003/0005028 A1* | 1/2003 | Dritschler | G06F 9/5061 718/104 |
| 2003/0083912 A1 | 5/2003 | Covington, III et al. | |
| 2003/0110067 A1* | 6/2003 | Miller | G06Q 10/06 705/7.23 |
| 2003/0212584 A1 | 12/2003 | Flores | |
| 2004/0230471 A1 | 11/2004 | Putnam Brookes | |
| 2004/0267601 A1 | 12/2004 | Angley | |
| 2005/0010456 A1 | 1/2005 | Chang et al. | |
| 2005/0071737 A1 | 3/2005 | Adendorff et al. | |
| 2005/0091093 A1* | 4/2005 | Bhaskaran | G06Q 10/0637 705/7.36 |
| 2005/0108043 A1 | 5/2005 | Davidson | |
| 2005/0165822 A1* | 7/2005 | Yeung | G06Q 10/10 |
| 2005/0261933 A1 | 11/2005 | Magnuson | |
| 2006/0053039 A1 | 3/2006 | Gamarnik | |
| 2006/0069607 A1 | 3/2006 | Linder | |
| 2006/0184408 A1* | 8/2006 | Giancola | G06Q 10/06375 705/7.37 |
| 2006/0184412 A1 | 8/2006 | Kagan et al. | |
| 2006/0184416 A1 | 8/2006 | Nag | |
| 2006/0235732 A1* | 10/2006 | Miller | G06Q 10/10 705/7.23 |
| 2006/0235778 A1* | 10/2006 | Razvi | G06Q 10/10 705/35 |
| 2007/0244738 A1* | 10/2007 | Chowdhary | G06Q 10/0637 705/7.31 |
| 2008/0010293 A1* | 1/2008 | Zpevak | G06Q 10/06 |
| 2009/0192867 A1 | 7/2009 | Farooq et al. | |
| 2018/0365604 A1 | 12/2018 | Farooq et al. | |
| 2019/0332978 A1 | 10/2019 | Farooq et al. | |

FOREIGN PATENT DOCUMENTS

| | | | | |
|---|---|---|---|---|
| WO | WO-2005008402 A2 * | 1/2005 | | G06Q 10/06393 |
| WO | WO-2008052911 A1 * | 5/2008 | | G06Q 10/06 |

OTHER PUBLICATIONS

Cherbakov, Luba, et al. "Impact of service orientation at the business level." IBM Systems Journal 44.4 (2005): 653-668. (Year: 2005).*
Wada, Hiroshi, et al. "Multiobjective optimization of sla-aware service composition." Services—Part I, 2008. IEEE Congress on. IEEE, 2008. (Year: 2008).*
Han, Kwan Hee, and Jun Woo Park. "Process-centered knowledge model and enterprise ontology for the development of knowledge management system." Expert Systems with Applications 36.4 (2009): 7441-7447. (Year: 2009).*
Authorized Officer Yolaine Cussac, Notification Concerning Transmittal of International Preliminary Report on Patentability (1 page) and International Preliminary Report on Patentability (6 pages) for International Application No. PCT/US2009/031131, dated Aug. 5, 2010.
International Search and Written Opinion, dated Aug. 10, 2009, PCT/US2009/031131.
Cherbakov, Luba, et al. "Impact of service orientation at the business level." IBM Systems Journal 44.4 (2005): 653-668. (Year: 2005).
Wada, Hiroshi, et al. "Multiobjective optimization of sla-aware service composition." Services—Part I, 2008. IEEE Congress on. IEEE, 2008. (Year: 2008).
Han, Kwan Hee, and Jun Woo Park. "Process-centered knowledge model and enterprise ontology for the development of knowledge management system." Expert Systems with Applications 36.4 (2009): 7441-7447. (Year: 2009).
Office Action (dated Mar. 30, 2010) for U.S. Appl. No. 12/019,004, filed Jan. 24, 2008.
Amendment (dated Jul. 28, 2010) for U.S. Appl. No. 12/019,004, filed Jan. 24, 2008.
Final Office Action (dated Sep. 21, 2010) for U.S. Appl. No. 12/019,004, filed Jan. 24, 2008.
RCE with amendment (dated Dec. 9, 2010) for U.S. Appl. No. 12/019,004, filed Jan. 24, 2008.
Advisory Action (dated Dec. 17, 2010) for U.S. Appl. No. 12/019,004, filed Jan. 24, 2008.
RCE (dated Dec. 21, 2010) for U.S. Appl. No. 12/019,004, filed Jan. 24, 2008.
Office Action (dated Oct. 25, 2011) for U.S. Appl. No. 12/019,004, filed Jan. 24, 2008.
Amendment (dated Jan. 18, 2012) for U.S. Appl. No. 12/019,004, filed Jan. 24, 2008.
Final Office Action (dated Apr. 6, 2012) for U.S. Appl. No. 12/019,004, filed Jan. 24, 2008.
Notice of Appeal (dated Jul. 3, 2012) for U.S. Appl. No. 12/019,004, filed Jan. 24, 2008.
Appeal (Nov. 5, 2012) for U.S. Appl. No. 12/019,004, filed Jan. 24, 2008.
Examiners Answer (dated Dec. 5, 2012) for U.S. Appl. No. 12/019,004, filed Jan. 24, 2008.
Office Action (dated Jul. 27, 2016) for U.S. Appl. No. 12/019,004, filed Jan. 24, 2008.
Amendment (dated Oct. 27, 2016) for U.S. Appl. No. 12/019,004, filed Jan. 24, 2008.
Final Office Action (dated Nov. 25, 2016) for U.S. Appl. No. 12/019,004, filed Jan. 24, 2008.
Final amendment (dated Jan. 25, 2017) for U.S. Appl. No. 12/019,004, filed Jan. 24, 2008.
Advisory Action (dated Dec. 17, 2017) for U.S. Appl. No. 12/019,004, filed Jan. 24, 2008.
RCE with Amendment (dated Mar. 27, 2017) for U.S. Appl. No. 12/019,004, filed Jan. 24, 2008.
Office Action (dated May 24, 2017) for U.S. Appl. No. 12/019,004, filed Jan. 24, 2008.
Amendment (dated Aug. 24, 2017) for U.S. Appl. No. 12/019,004, filed Jan. 24, 2008.
Final Office Action (dated 10/32/2017) for U.S. Appl. No. 12/019,004, filed Jan. 24, 2008.
Final Amendment (dated Jan. 2, 2018) for U.S. Appl. No. 12/019,004, filed Jan. 24, 2008.
Advisory Action (dated Feb. 6, 2018) for U.S. Appl. No. 12/019,004, filed Jan. 24, 2008.
RCE with amendment (dated Mar. 6, 2018) for U.S. Appl. No. 12/019,004, filed Jan. 24, 2008.
Notice of Allowance (dated May 18, 2018) for U.S. Appl. No. 12/019,004, filed Jan. 24, 2008.
Office Action (dated Dec. 26, 2018) for U.S. Appl. No. 16/114,337, filed Aug. 28, 2018.
Amendment (dated Mar. 26, 2019) for U.S. Appl. No. 16/114,337, filed Aug. 28, 2018.
Notice of Allowance (dated Apr. 16, 2019) for U.S. Appl. No. 16/114,337, filed Aug. 28, 2018.
Office Action (dated Jul. 30, 2019) for U.S. Appl. No. 16/505,786, filed Jul. 9, 2019.

(56) References Cited

OTHER PUBLICATIONS

Amendment (dated Oct. 30, 2019) for U.S. Appl. No. 16/505,786, filed Jul. 9, 2019.
Notice of Allowance (dated Nov. 8, 2019) for U.S. Appl. No. 16/505,786, filed Jul. 9, 2019.

* cited by examiner

OPTIMIZING A BUSINESS MODEL OF AN ENTERPRISE

This application is a continuation application claiming priority to Ser. No. 16/505,786, filed Jul. 9, 2019, now U.S. Pat. No. 10,592,828, issued Mar. 17, 2020, which is a continuation of Ser. No. 16/114,337, filed Aug. 28, 2018, U.S. Pat. No. 10,395,189, issued Aug. 27, 2019, which is a continuation of Ser. No. 12/019,004, filed Jan. 24, 2008, U.S. Pat. No. 10,095,990, issued Oct. 9, 2018.

TECHNICAL FIELD

The present disclosure relates to methods and systems for developing, implementing, transforming, and governing a business model of an enterprise.

BACKGROUND

The business world is constantly evolving. More recently, globally integrated enterprises are emerging to frame strategy, management, and operations in pursuit of a new goal, which includes the integration of production and value delivery worldwide with business services as a language of business communication. Current technology strategies must address the requirements of globally integrated enterprises. These requirements can include various combinations of three emerging product categories: corporate performance management, extension of enterprise resource planning (ERP), and services oriented architecture (SOA). These enterprises leverage many different existing methodologies and systems (i.e., different combinations of the product categories) that pertain to the various aspects of business transformation management from strategy to execution.

There are three methodologies that stand out in the areas of strategy and execution of business transformation: balanced scorecard (BSC), control objectives for information and related technology (COBIT), and information technology (I/T) infrastructure library (ITIL). These three methodologies, among several others, are expensive, ad-hoc, and, more importantly, do not scale at the rate of transformation as the global ecosystem increases.

BSC focuses on measurement-based management by developing metrics, collecting and analyzing data from four perspectives, which include learning and Growth, internal business processes, customer, and financial perspectives. So called strategy maps across these perspectives guide the transformation process from strategy to execution. This approach, however. has several drawbacks. COB IT and ITIL are complementary methodologies. ITIL focuses on best practices for I/T operations and standardization, while COBIT focuses on I/T governance including planning, operations, and monitoring. COBIT uses ITIL from a services delivery perspective. However, COBIT and ITIL also have several limitations.

SUMMARY

The present disclosure recognizes that it is essential to align business and information technology (I/T) strategies in order to run or transform a business successfully in the current era of globally integrated enterprises. Accordingly, one aspect of the: present disclosure provides a method of implementing and managing a business model of an enterprise. The method includes defining a business model using a business model tool that is executed by a computer, wherein the business model is based on interrelated business strategy, business goal and business constraint data and includes a business service. A first set of data representing a benchmark performance value of the business service is input into the computer, and the enterprise is operated in accordance with the business model. The enterprise is monitored to determine an actual performance value of the business service. The actual performance value and the benchmark performance value are processed in the computer to affect a comparison therebetween, and the business model is modified based on the comparison.

According to another aspect, the present disclosure provides a method of transforming a business model of an ongoing enterprise. The method includes defining multiple business models using a business model tool executed by a computer. Each of the multiple business models is based on interrelated business strategy, business goal and business constraint data and includes a business service. The multiple business models include a current business model representing a current operation of the enterprise. An evaluation routine is run on a computer to evaluate the defined business models and to determine business service leverage as between the current business model and another one of the multiple business models. A model optimization is run on the computer to optimize at least one of the multiple business models based at least in part on the determined business service leverage. The enterprise is operated in accordance with the optimized business model.

In accordance with a further aspect, the present disclosure provides a computer-based method of developing an optimized business model for. an enterprise. The computer-based method includes inputting into a computer a first set of data representing a business strategy, a business goal and a constraint, inputting into the computer a second set of data representing relationships between the input business strategy, business goal and constraint, and inputting a third set of data into the computer to define a business model that includes at least one resource. An initial benchmark value for the resource is determined, and a model optimization engine resident in the computer is processed based on the defined business model, the input business strategy, business goal and constraint to iteratively generate an output benchmark value, update the initial benchmark value based on the output benchmark value, update the defined business model, and process the model optimization engine based on the updated benchmark value and model, until updating the benchmark value involves changing the benchmark value by less than a predetermined benchmark value error threshold. The enterprise is subsequently in accordance with the updated business model.

In still a further aspect, the present disclosure provides a computer-based method of developing an optimized business model for an enterprise. The method includes inputting into a computer a first set of data representing a business strategy, a business goal and a constraint, inputting into the computer a second set of data representing relationships between the input business strategy, business goal and constraint, and inputting a third set of data into the computer to define a business model that includes at least one resource. An initial benchmark value for the resource is determined, and a model optimization engine resident in the computer is processed based on the defined business model, the input business strategy, business goal and constraint to iteratively generate an output benchmark value, to update the initial benchmark value based on the output benchmark value, to update the defined business model, and to process the model optimization engine based on the updated benchmark value and model, until updating the benchmark value involves changing the benchmark value by less than a predetermined benchmark value error threshold. The enterprise is subsequently operated in accordance with the updated business model.

The present disclosure further anticipates that the methods can be implemented in the form of a computer program product, tangibly embodied in a machine-readable storage device, for deploying software to a computer system, wherein the computer program product includes instructions that are operable to cause the computer to execute one or more, or a combination of the features of the methods described herein.

The methods and systems described herein provide an integrated framework that includes a capability assessment of current and future capabilities, an analysis of gaps between current and future capabilities, bottleneck identification, transformation roadmap generation, resources sharing (e.g., people, systems, and assets), policy construction, implementation, and integration of business components and their principal I/T enablers. The integrated framework of the present disclosure provides a complete set of solutions that can be transformed into an action plan based on strategic decisions from executives. In this manner, leverage on the existing setup and resources can be maximized with minimum disruption in business operations. Furthermore, the integrated framework of the present disclosure unites concepts, best practices, and norms, and complements existing frameworks with new concepts and methodologies that fill the gaps to provide step-by-step guidelines. These guidelines include strategizing, planning, monitoring, and governance of business components and their principal I/T enablers, which function in concert in pursuit of shared business and I/T services, processes, and activities). As a result, the integrated framework of the present disclosure provides fundamental design methodology to have business architecture steer the I/T architecture and vice versa in a closed-loop fashion to cope with rapidly changing business environment.

The details of one or more embodiments of the present disclosure are set forth in the accompanying drawings and the description below. Other features, objects, and advantages of the present disclosure will be apparent from the description and drawings, and from the claims.

DESCRIPTION OF DRAWINGS

Like reference symbols in the various drawings indicate like elements.

DETAILED DESCRIPTION

The present disclosure describes methods and systems that implement an integrated framework for business transformation that integrates across business functions and provides a closed-loop model that enables continuous improvement of the business model and its transformations. The integrated framework enables new and existing businesses to create and/or constantly manage their business models, and to transform the business models to meet the changing needs of their customers and partners. The integrated framework of the present disclosure ties together models and methodologies for running various functions of the business, such as information technology (I/T) and finance, and enables these functions to work cohesively to achieve a strategic transformation of the business models.

Figure 1:
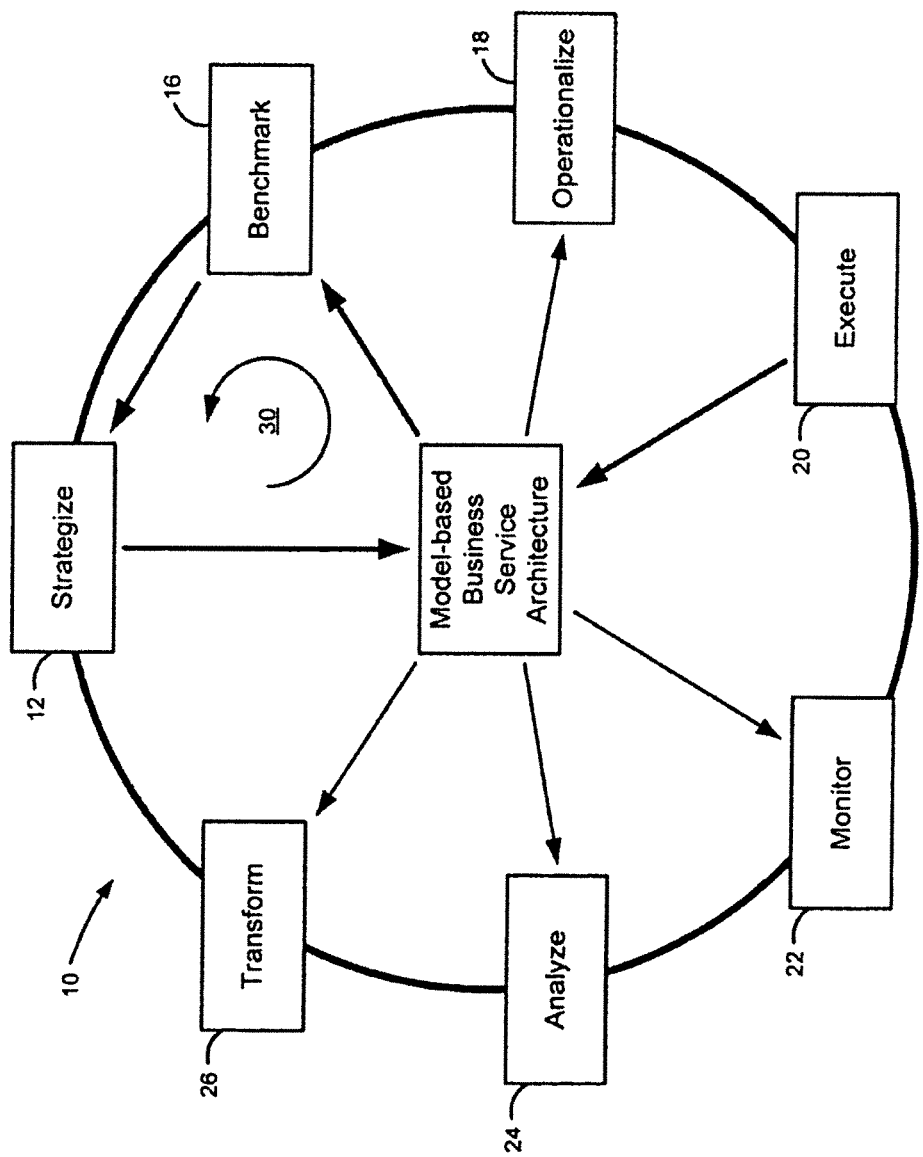
FIG. 1 is a block diagram that illustrates a model-based business transformation integrated framework in accordance with the present disclosure.

Referring to FIG. 1, a block diagram illustrates a model-based business transformation (MBT) integrated framework 10 in accordance with the present disclosure. The MBT integrated framework 10 (hereinafter "the integrated framework") provides a methodology for managing business transformation of the current and new business model(s) to the executive management of a business enterprise. As described in further detail herein, the integrated framework 10 uniquely combines various business functions with a well-defined system for efficiently regulating and governing operation of the enterprise.

The integrated framework 10 provides a plurality of stages including a strategize stage 12, a model stage 14, a benchmark stage 16, an operationalize stage 18, an execute stage 20, a monitor stage 22, an analyze stage 24, and a transform stage 26. In the strategize stage 12, balanced scorecard techniques and best practices are used to identify the business strategies and their associated business drivers, goals, objectives, and key performance indicators (KPIs). In the model stage 14, a new business modeling technique with templates is used to identify the as-is and to-be business models associated with the identified strategies. Business models identify the enterprise operations, which include business components, business component groups, service groups, business services, organization, business processes, and assets. The business models also identify customer segments and partner services. Further, the business models can reference existing, domain models or templates and their associated industry performance benchmarks and business capability levels. In the benchmark stage 16, similar business domain models having related structure and historical data are used for analyzing and benchmarking to future transformation goals. As discussed in further detail below, an optimization technique can be applied to particular business models given various input constraints such as budget, timeline, and resources. This optimization can graphically depict the outcome of applying the input constraints on a particular business model. These results are used in a closed-loop fashion to let management effectively choose a transformation or business model with their target capability levels, prior to operationalizing the business model.

The strategize, model and benchmark stages 12, 14, 16 define a development loop 30 that can be implemented to develop a new business model or models, and/or to modify an existing business model or models prior to operationalizing the business model(s). More specifically, several iterations of the development loop 30 can be executed in order to develop a business transformation roadmap, calibrate performance benchmarks, and/or update performance targets.

In the operationalize stage 18, the detailed business processes, associated workforce and program management are planned, and operational models are developed. In short, the operationalize stage 18 puts the business model(s) into real-world, executable activities. The operational models define the physical implementation of the business model(s). Any external services are sourced as needed. Further, performance criteria are identified and are associated back to the business model(s). In the execute stage 20, program management, contract management, I/T operations, and assets are each enabled. Performance characteristics from each of the resources are gathered and are associated back to business model(s). In the monitor stage 22, dashboards and/or reports are created and are used for monitoring the business performance, which is linked and correlated, to the business strategies, models, and goals. Business performance information is aggregated to determine the achieved business capability levels. In the analyze stage 24, the actual operational data becomes part of the historical data that is used for the optimization techniques to recalibrate the original goals and targets. In the transform stage 26, the transformations required to optimize the execution towards business goals are identified. Change management is performed to execute those changes and monitor against the defined performance goals.

Figure 2:
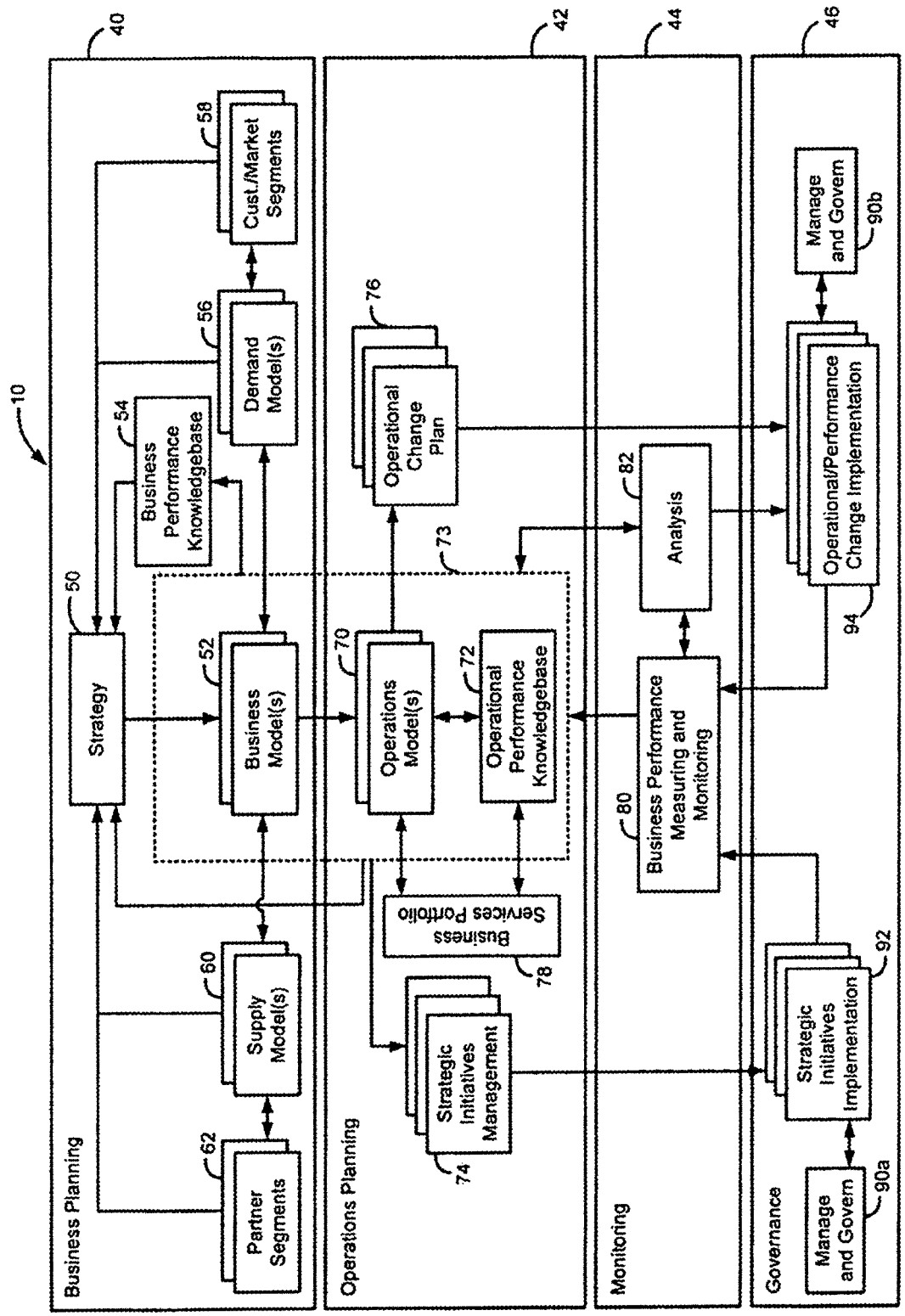
FIG. 2 is a block diagram that illustrates more detailed components of the integrated framework of FIG. 1.

Referring now to FIG. 2, a block diagram illustrates more detailed components of the integrated framework 10 of the present disclosure. The integrated framework 10 includes a business planning component 40, an operations planning component 42, a monitoring component 44, and a governance component 46. The business planning and operations planning components 40, 42 embody business planning concepts, which include, but are not limited to business details, business strategies, business models, programs, a business service portfolio, partners, customers, and agreements.

The business planning component 40 is used to define a business plan for the enterprise. The business plan is a formal statement of largely enforced business goals, the reasons why the goals are attainable, and the plan for achieving those goals. Business plans function as decision making tools, the content and format of which is determined by the goals and the audience. Consequently, the business plan can include at least one of, or a combination of various types of business plans. The business planning component 40 includes a strategy sub-component, business model sub-components 52, a business performance knowledgebase sub-component 54. Other sub-components of the business planning component 40 include, but are not limited to, demand model sub-components 56 and customer/market segments sub-components 58, on the demand side, and supply model sub-components 60 and partner segments sub-components 62, on the supply side.

The strategy sub-component 50 executes strategic planning, which focuses on an enterprise's future course and defines strategic direction and goals. Strategic planning deals with at least one of the following key questions: What does the enterprise do?; Who does the enterprise do it for?; and How does the enterprise excel and avoid competition? Consequently, strategic planning can be viewed as the enterprise's plan for the next year or typically next 3 to 5 years, for example, although some can have a longer vision, such as a 20 year vision. Strategic planning is the process of developing strategies to reach a defined objective. A portion of planning that is identified as strategic is expected to operate on a large scale and to take in the big picture. This is different from tactical planning, which focuses on the tactics of individual, detailed activities. Strategic planning seeks to improve future results by influencing the outside world and/or adapting current programs and actions to have more favorable outcomes in the external environment.

A proper strategic plan serves as a map that can be utilized to establish points along the route, indicating why each is important and how it can best be reached. The strategic plan builds from mission, vision, and values details, as well as business strategies, models, business service portfolios, programs, partners, customers, and agreements, each of which is discussed in further detail below. An exemplar strategic methodology that can be implemented includes balanced scorecard for strategic management with other domain specific frameworks. The balanced scorecard framework of strategic management measures and manages strategic performance. The results are based on the perspectives of learning and growth, the business process, customers, financials and assets. The balanced scorecard is a comprehensive, top-down view of organizational performance with a strong focus on vision and strategy. It provides a framework for implementing strategies that translate an enterprise's mission and strategy into a set of performance measures. For example, a manager can use the balanced scorecard measures to reduce delays and to increase throughput of bottleneck operations.

Strategic management involves developing policies and plans to achieve business objectives. Exemplar business objectives include, but are not limited to, competitive advantage, downsizing, and/or new product development. By formulating good business strategies, executives can allocate the proper degree of resources to implement these policies. Also, business strategies serve as the foundation, on which the business model is built. In short, business strategy is about defining where the enterprise is trying to get to in the long and/or short term, which markets the enterprise should compete in, and what kinds of activities are involved in such markets, how the enterprise can perform better than the competition in those markets, and/or what external, environmental factors affect the enterprise's ability to compete.

The fundamental details of a business enterprise include mission, vision, and core values. The mission of an enterprise is the highest level statement of objectives, and provides a broad description of the purpose and policy of the enterprise. For example, Wal-Mart's mission statement states: "To give ordinary folk the chance to buy the same thing as rich people." Vision is an inspiring picture of a preferred future. A vision is not bound by time, represents global and continuing purposes, and serves as a foundation for a system of strategic planning. An enterprise's vision depicts an ideal future for the market or constituency and the contributions that the organization can make to that end. For example, Westin Hotels' vision statement states: "Year after year, Westin and its people will be regarded as the best and most sought after hotel and resort management group in North America." Core Values provide an ethics framework to guide the daily actions and decisions of an enterprise and represent the standards that employees and business components will use to measure all individual and collective actions. Exemplar core values include, but are not limited to, accuracy, respect, dedication, diversity, improvement, enjoyment, loyalty, credibility, honesty, innovativeness, teamwork, excellence, and the like.

A business strategy in an enterprise is a pattern of policies and plans that specifies how the enterprise should function over a given period of time. A business strategy may define areas for product or service development, techniques for responding to competition, means of financing, size of the organization, and/or the image that the enterprise will project. Using an analysis method, such as Strengths, Weaknesses, Opportunities and Threats (SWOT), business strategies can be formulated that build on strengths, resolve weaknesses, exploit opportunities and avoid threats.

The following provides a non-exhaustive list of exemplar types of business strategies, and a brief description of each:

| Business Strategy | Description |
| --- | --- |
| Competitive Advantage | provides the enterprise some advantage over its rivals |
| Cost Advantage | ways to seek out and secure a cost advantage (eg., lower average costs, lower labor costs) |
| Market Dominance | ways to achieve market dominance (e.g., internal growth, acquisitions) |
| New Product Development | ways to keep ahead of competitors |
| Contraction/ Expansion | focus on core competencies or expanding into a range of markets |
| Price Leadership | ways to dominate the industry so that others follow your price lead |
| Global | ways to expand globally |
| Reengineering | ways to use the existing resources of tire enterprise to improve its performance |
| Downsizing | selling off unwanted parts or laying off people, etc. |
| Delayering | ways to promote a flat management structure, removing bureaucracy and speeding up decision making |
| Restructuring | ways to completely re-think the way the enterprise is organized |

A business strategy can include, but is not limited to, strategic intents (e.g., themes, goals, and objectives), and performance benchmarks (e.g., business drivers, political, economical, social, and technological (PEST) factors, functional categories, performance categories and performance indicators). The mission, vision and value statements act as the basis for defining goals, and the business strategies are defined to achieve the goals. The business strategies belong to different perspectives and themes. The objectives are then defined so as to achieve the goals. The vision, goals, strategies and objectives can be viewed using a strategy map, or a strategy outline.

Strategic intents are the key themes that will inform decision making, the strategic goals that are to be reached, and the short-term objectives on how to reach those. goals. A theme represents broad ideas or categories of strategic objectives. An exemplar theme can include "continuous improvement", which states that all business functions must develop and maintain a continuous improvement plan with milestone quality objectives. Goals are desired states of affairs of a system, and are both qualitative and quantifiable. In a strategic planning system, goals are ranked for priority. Although goals stretch and challenge an enterprise, they are realistic and achievable. Goals form the basis for defining strategies, and can be thought of as the target, while the objectives, discussed in further detail below, outline the path to achieving a particular goal. Some exemplar goals include, but are not limited to, reducing long-term costs, reducing error rates, and/or minimizing inconsistent performance.

Objectives are clear, measurable targets for a specific action, and mark interim steps toward achieving an enterprise's long-range mission and goals. Objectives are measurable, time-based, result-oriented statements of intent. More specific than goals, objectives are the quantifiable targets that must be achieved to enable the business to succeed in its strategic mission. Each objective is based on a vision, and is linked to one or more strategic goals, and possibly other objectives. Each objective can follow one or more themes, and falls under at least one perspective. Exemplar perspectives include, but are not limited to, financial, customer, internal, learning and growth, and/or assets. These perspectives are used for monitoring the performance of the enterprise, using the balanced scorecard methodology, for example. For the exemplar goal "reduce error rates", an exemplar objective could be "improve client satisfaction", which would fall under customer perspective. The objective could be linked to the vision "establish quality, cost-effective, accountable services", for example, and come under the "continuous improvement" theme.

One way of linking strategic management and operational execution for effective decision making is through the delivery of relevant performance benchmarks. Using the development loop 30, performance benchmarks can be simulated on strategies by simulating against the developed business model(s). In order to analyze the business strategies, at least one or more of business drivers, critical success factors, functional categories, performance categories, and performance indicators are defined. Business drivers are internal or external conditions, and/or influences that significantly impact and/or set direction for strategic planning and/or decision making. Political, economical, social, and technological (PEST) factors can be taken into consideration, to classify the business drivers. Exemplar classifications include, but are not limited to, challenge, economic, demographic, regional, environmental, competitive, legislative, and/or social. The particular classification can vary based on business needs.

Critical success factors are the areas in which satisfactory results will ensure competitive performance for the individual, department, and/or enterprise as a whole. Critical success factors define the key areas where things must go right for the business to nourish and the goals to be attained. As one example, some of the critical success factors for a business specializing in customer support could include, but are not limited to, increasing the number of customers, and/or increasing the number of customer service representatives.

Performance and functional categories are orthogonal categories that assist in categorizing or grouping performance metrics and evaluating performance using these metrics. Performance categories are more general across domains, whereas functional categories are functional domain specific ways of grouping the performance indicators. By way of non-limiting example, for call center related services, the performance categories may be availability, accuracy, quality, client satisfaction, and the like. Functional categories will depend on the functionality of the services being managed through that call center. A call center providing employee benefits and human resource services, for example, may have functional categories such as payroll, insurance, workers comp, counseling, and the like. On the other hand, a call center providing IT operations support, for example, may have functional categories such as workstation support, networking, communications, email, and the like. Exemplar functional categories include, but are not limited to, IT services, legal services, outreach, procurement, human resource, financial, and communication. A performance category sub-groups areas of effort. Exemplar performance categories include, but are not limited to, quality, timeliness, accuracy, and/or availability.

Performance indicators are indicators of performance, that are a representation, numeric or otherwise, of the state of or outcomes from a business service. Performance indicators can be classified in a variety of ways depending on the needs of the enterprise. Exemplary classifications include, but are not limited to, key performance indicator (KPI), product key quality indicator (KQI), service KQI, transformation, key performance metric, and/or service levels. Each performance indicator falls under a functional category and a performance category, is tied to an objective and has an earnback category. An earnback category is a mechanism that enables vendors to earn credit towards any penalties for underperformance and not meeting performance goals. Each performance indicator can be assigned an earnback category. If the vendor exceeds performance as measured by that indicator, some credits are earned against that category, which can be applied against any penalties for underperformance against the same or other indicators based on business rules. Exemplar earnback categories include, but are not limited to, agency mission critical, mission critical, operations critical, project administration, and no earnback. Further, each performance indicator can have performance impacts associated therewith. A performance impact specifies what is impacted if the particular performance indicator is not met.

The business model sub-component 52 defines one or more business models for the enterprise. A business model can be characterized as a conceptual tool of elements and their relationships. The business model expresses the business logic of an enterprise, and describes the value the enterprise offers. The business model further describes the structure of the enterprise including its network of partners for creating, marketing, and delivering the value, and generating profitable and sustainable revenue streams.

An exemplar business model includes a service-oriented business model. A service-oriented business model may be preferred over an organizational-oriented business model, for example, because it is difficult to build a stable organization-oriented business model in a enterprise having a continuously changing structure. By treating each element of the enterprise as a service, reusability of enterprise resources is promoted, and a stronger, more stable business model is ensured. Reusability of enterprise resources is provided by the integrated framework 10, and is particularly applicable in cases where the enterprise may have more than one business model. What often occurs with traditional business models is that each business model is built to have its own dedicated resources. This results in wastage of valuable resources. By maintaining a business service portfolio, discussed in further detail below, business modeling in the integrated framework 10 of the present disclosure becomes as simple as plug-and-play. Consequently, business strategies help in building the business model top-down, while the business service portfolio helps bottom-up in building a better, more successful, and less expensive business models.

The business model sub-component 52 enables an enterprise to view its business model(s) from various perspectives including, but not limited to, financial, customer, internal, learning and growth, and assets. The financial and customer perspectives provide the driving force for creating the business model. After the business model is created, it becomes the driving force for the future course of the enterprise by supporting all the perspectives. In particular, the business model supports the internal, learning and growth, and assets perspectives. By providing a two-way linkage, or dependency between the business model and the financial and customer perspectives, there is always information fed back and forth for improving the business model. Exemplar linkages to the customer and financial perspectives include, but are not limited to, the identification of newer customer pools and the financial impact of the particular business model. Another way of looking at business modeling within the integrated framework of the present disclosure is that the financial and customer perspectives form the building blocks of the business model, and the subsequent conception of the operations model(s), discussed in further detail below, takes place through the internal, learning and growth, and assets perspectives The business model(s) can be decomposed into parts, where the enterprise forms the core of a network having customers and partners linked to it. The customer side is defined using the demand model sub-component 56 and the customer/market segment sub-component 58. The partner side is defined using the supply model sub-component 60 and the partner segment sub-component 62. The enterprise can be further decomposed into business components. Consequently, an exemplar business model can include enterprise operations, partner services, and customer segments. The enterprise forms the nerve center of the network with connections to partners, who extend their services, and customers, who avail the services of the enterprise.

The enterprise operations defined using the business model sub-component are the core services of the enterprise that can be developed in-house, outsourced, or mixed. An outsourced service is one that is provided by a partner, an in-house, or in-sourced service is one that is provided by the enterprise itself, and a mixed service is one that is provided by both a partner and the enterprise. The enterprise core operations includes the service group, business component groups, and business components. The enterprise can include one or more service groups, each service group having business components, or business component groups. The business component group is a collection of business components. Within the integrated framework 10 of the present disclosure, each business component has services, people, processes, and assets linked to it. A business component is the real-world implementation of an autonomous business concept, or business process. The business component is composed of all artifacts (e.g., services, people, process, assets) necessary to express, implement, and deploy a business concept as an autonomous, reusable element of a business model. The service group is a group of business services that provide common value, and is a logical grouping on how to organize the structure, which could be different from the organizational structure of the enterprise. Each service group includes one or more business components, and is an implementation of an autonomous business concept, or business process.

A business component can include, but is not limited to, an organizational business component (e.g., human resources, operations, I/T), and a service-oriented business component (e.g., mail handling, order management, customer feedback). By following a service-oriented approach, the model remains the same as strategies change. Each business component includes services, people, and processes. Each business component also includes the assets necessary to express, implement, and deploy a business concept as an autonomous, reusable element of a business model. The level of detail covered depends on needs of the enterprise. For example, if a business component were outsourced, the enterprise may be less concerned with the internal process aspect, and may be more interested in the service aspect. Further, each business component includes a service performance indicator (SPI) and a maturity level. The SPI can be used for benchmarking purposes. The maturity level describes the evolutionary plateau of process improvement. Each maturity level stabilizes an important part of the enterprise's processes. Maturity levels, which belong to the staged representation, apply to an enterprise's overall maturity, and each maturity level includes a predefined set of process areas.

A business component group is a collection of similar business components that itself can be treated as a business component. As a whole, the business component group provides a certain service, and each of the business components within the group also provides a service that could be a part of the group service. For example, if a hospital is considered as a business component group, then each hospital location could be a business component. The hospital as a whole provides health care services, and each of the locations could be providing cardiac, or pediatric health care, for example.

During business modeling, the partners of the enterprise may or may not be known. If a particular partner is known, that partner can be linked from a partner catalog, as discussed in further detail below. Also, the partnership can be such that a process or activity is performed by the partner. Consequently, a partner can be associated with either process, or activity.

Partners are collaborators of the enterprise. In business planning, some partners are defined under partner services, while others are classified under core enterprise operations, for example. Those partners that are defined under partner services have a looser coupling with the enterprise, and manage their own internal operations. For example, if a package must be shipped, FedEx could be classified as a partner service provider of the enterprise, whereby the enterprise is not concerned with the internal processes of how FedEx processes its deliveries. On the other hand, a partner that is classified under core enterprise operations is one where the performance of the partner immediately affects the performance of the enterprise. An outsourced customer service center (e.g., a call center), for example, would be classified under core enterprise operations, because the performance of the partner immediately affects the performance of the enterprise.

It should be noted that a vendor is an independent business, from whom the enterprise purchases operational supplies and the like. Exemplary operational supplies include, but are not limited to, low cost, ready-made products like printer ink, multi-purpose printing paper, stationary supplies, office supplies, and the like. A partner, on the other hand, is a business that has a closer bond to the enterprise, and is one that takes some risk and expands their skill sets to meet the enterprise's needs. The bond is such that the partner shares in the enterprise's success. An exemplary partner includes, but is not limited to, an outsourced customer service center with custom skill sets. State agencies, for example, define partners as another state agency, with which they exchange information. For example, a state's Health and Human Services Department can have a partnership with that state's Workforce Commission. Consequently, a continuum can be envisaged with vendor on one end and partner on the other. The businesses, from which the enterprise purchases goods and services will all fall somewhere on that continuum, and not necessarily neatly at either end. Hence, the terms partners and vendors are used interchangeably herein. For example, partners can be, but are not limited to, business partners, business vendors, preferred business partners and/or preferred vendors.

The types of partners are determined by the enterprise. Exemplary partner types include, but are not limited to, strategic partners, emerging partners, tactical partners, and legacy partners. With regard to strategic partners, two or more enterprises can form a strategic partnership, for example, when each possesses one or more business assets that will help the other, but that it does not wish to develop internally. An automotive manufacturer may form strategic partnerships with its parts suppliers, for example, or a music distributor with record labels, as another example. Emerging partners are those that develop new, innovative technologies, for example, that the enterprise is trying to approach. Tactical partnerships arise from immediate need. These can be short-term partnerships, and the enterprise might later on replace the work done by these partners, or develop it in-house, for example. A tactical partner can transition to become a strategic partner. Legacy partners are partners, with whom the enterprise has developed a long-term partnership.

A dependency level can be assigned to each partner. The partner dependency level can be high, medium, or low, for example, depending on the degree to which the enterprise is dependent on the particular partner. For example, Company ABC is primarily an online book store, and hence does a significant amount of shipping. Consequently, the dependency level of a particular shipping partner (e.g., UPS, FedEx) will be high. Furthermore, partners can belong to different tier levels (e.g., Tier 1, Tier.2, or Tier 3). Each enterprise's definition of a tier level can be different. For example, a Tier 1 partner for a particular enterprise could mean that that partner provides more discounts to the enterprise for its services. For another enterprise, for example, Tier 1 could be the preferred partner, while Tier 2 and Tier 3 partners could be secondary and tertiary, respectively. For still another enterprise, even though the needed services are communicated to all of the partners, the response from the Tier 1 partner takes precedence over the responses of the Tier 2 and Tier 3 partners. Finally, a vendor rating is used for vendor performance management. A vendor rating can be assigned to each partner based on viability, responsiveness, quality of product, and support. Depending on the needs of the enterprise, additional vendor rating categories can be defined.

Partner services are business services that are being provided by a partner. These are services that are outsourced, or contracted out by the enterprise. A partner group can have one or more service groups, which in turn can have partner services. A service group is a group of partner services that provide common value, and is a group of similar partner services that can be treated as a partner service in and unto itself. Accordingly, the partner service group, as a whole, provides a certain service, and each of the partner services within the group also provide a service that could be a part of the full service. A partner service is a business service that is being provided by a partner. Partner services are outsourced, or contracted out to a partner or vendor. A partner service has a service, or key performance indicator (KPI) associated with it for benchmarking purposes.

In short, the partner segment sub-component 62 maintains a catalog of partners capable of providing service to the enterprise. During business modeling, a type of partner that may be required (e.g., shipping partner) can be specified, but the company that will fill that role need not be identified until later. Furthermore, the partner segment sub-component 62 provides and maintains a directory of all the current and potential partners. If the enterprise already knows who it would like to partner with, the particular partner can be easily linked from the partner segment sub-component 62 to the business model sub-component 52.

The supply model sub-component 60 enable a supply model or models to be defined. A supply model defines the supply quantity, schedule, and medium of transportation, other business terms and conditions. The supply model sub-component 60 is a utility or high level application that tracks, schedule and manages various supplier specific agreements to make sure that these fulfill the organization's inbound need. A supply model is related to inbound logistics management.

The demand model and customer segment sub-components 56, 58 enable the customer side of the business model to be developed. When the enterprise would like to identify it's customers, it is useful to think of what is it that the enterprise wants to develop, or is developing, and who the target audience, or market is. A listing of all of the potential customers the enterprise would like to target forms a customer catalog. Customers can be individual customers or customer segments. The customer/market sub-component enables the enterprise to create and maintain a customer portfolio, if so desired by the enterprise. By maintaining a customer catalog, specific services can be defined keeping the market in mind. Further, the level of service that is provided (e.g., customer satisfaction) can be determined. The enterprise has the ability to tie a customer to the service through service level agreements (SLAs).

An SLA is a contract between a service provider and the enterprise, which stipulates and commits the service provider to a required level of service. An SLA should contain a specified level of service, support options, enforcement, or penalty provisions for services not provided, a guaranteed level of service performance as it relates to downtime or uptime, a specified level of customer support and what software or hardware will be provided, and for what fee. An SLA can be between the enterprise and a partner, where the enterprise monitors the performance of the partner service. In this case, the SLAs are defined under agreements, and are contractual in nature. This means that there can be incentives; or penalties associated with the SLA which depend on the compliance or non-compliance of the vendor to the terms of the SLA. An SLA can also be between the enterprise and a customer, discussed above, where the enterprise monitors its own performance to see if it meets the customer requirements. Further, an SLA can be between groups/departments or services within the enterprise.

An SLA can involve a customer that could be a single entity, or a customer segment. A customer segment is a group of customers with similar interests in the enterprise's products, and/or services. The customer segment can be created based on the particular customer demographics, and lifestyle, for example. Each customer segment can encompass hundreds of customers. Similar customers can be grouped within the customer segment. A customer group is a collection of customer segments that can also be grouped, for example, based on demographics, and lifestyle. The grouping of customers into customer segments works differently in the private and government sectors. For example, a computer company in the private sector could have segments including, but not limited to, "$0-$1000", "$1000-$2000" and "$2000 and above" based on the price of the products that they develop. On the other hand, in the government sector, the segments could be, for example, "15% below Federal Poverty Line", "30% below Federal Poverty Line", and "50% below Federal Poverty Line". The enterprise can identify different services for each sector by looking at the respective customer segments.

By creating and maintaining a customer portfolio, the enterprise develops a comprehensive listing of current and future customers, and can categorize these customers in customer segments, and customer groups. This can be invaluable in current, as well as future advancement of the enterprise, and in achieving the vision and mission of the enterprise. Knowing one's customers can be considered a key rule of successful business modeling. Further, the level of service provided to the customer helps to improve the business model, and drive the vision of the enterprise.

In short, business modeling forms the core of the operations planning, monitoring, and governance stages. In the business planning stage, the enterprise defines the "as-is" and "target" business model using business components, discussed in further detail below, and capability levels as a construct. Further, the enterprise can identify key business components and capability requirements based on specific strategy goals, as well as identify current capability of the enterprise in the context of those goals. The enterprise can also create and simulate execution of multiple business models to achieve strategic goals.

With continued reference to FIG. 2, the operations planning component 42 is used to define an operational plan for physically implementing the business model(s) developed in, and output from the business planning component 40. The operations planning component 42 includes operations model sub-components 70, an operational performance knowledgebase sub-component 72, strategic initiatives management sub-components 74, operational change plan sub-components 76, and a business service portfolio sub-component 78. Using the operations planning component 42, the enterprise defines operational capabilities required to enact the business model(s), and can create an operational capability where business components are shared in executing different business models. The business model sub-component 52, the operations model sub-component 70, and the operational performance knowledgebase sub-component 72 define operations planning group 73.

The operations model sub-component 70 defines one or more operations models, which are the physical, real-world implementation of the business model. Accordingly, the operations model is based on the developed business model(s). By way of non-limiting example, an operations model that caters to several business models (e.g., using an inventory of shared resources) can include a railway company's operations. There may be a plurality of business models, for example (e.g., freight trains; passenger trains, and luxury travel). The several business models make use of shared resources including, but: not limited to, rail tracks, engines, an electricity network, a communication network, stations, staff, maintenance and repair facilities, websites, security, and management. An operations model for the rail company can define a working plan (e.g., daily, weekly, monthly, and annual schedules), a division of labor and duty, and a sharing schedule of every shared resource (e.g., tracks, in particular) so that overall revenue of the business models is maximized under whatever business constraints are imposed (i.e., quality of luxury travel, delivery of freight within specified time, and the like).

By way of another, non-limiting example, a government agency can offer several services to citizens and residents in a state or county, or across the county. For example, a transportation agency can provide services such as vehicle registration, construction services (e.g., roads, and bridges), toll collection, traffic operations, and transportation planning. A department of public safety can provide services such as drivers licenses, state troopers, and a criminal history search. A department of health can provide regulatory services, social services for public assistance, assistance for the needy and children, and so on. From the agency's perspective, these services are individual business models that share a collection of common resources that can include, but are not limited to, offices, websites, work force, staff, administration, computing facilities, faxes, printers; telephones; parking, distribution centers, call centers, and IT infrastructure. Each of these business models can have its own philosophy, objective, goals, business constraints, target population (e.g., market), suppliers, and policies. However, the business models are all implemented using the shared resources without affecting another business model's performance. Accordingly, an agency's operations model is an efficient implementation of all of these business models using shared resources so that each of the business models achieves its goals and total expenses on shared resources are held to a minimum. The operations model can list out the schedule, percentages, and margins of tolerance of utilization of each resource allocated to each business model, for example.

The business services portfolio sub-component 78 and the operational performance knowledgebase sub-component 72 are interlinked with one another, as well as with the operations model sub-component 70. Consequently, the operations model sub-component 70, business services portfolio sub-component 78, and operational knowledgebase subcomponent 72 provide inputs and outputs (i.e., feedback) to one another.

The business services portfolio sub-component 78 provides an inventory of the available services, as well as the current and potential capacity of each. In an emerging business ecosystem where the enterprise capabilities are defined through services, and where strategies are executed through internal service or partner combinations, the business services portfolio enables a model-driven services development and provision plan. This capability enables enterprises to identify current inefficiencies, develop new efficient solution options, and enable effective monitoring, while effecting desired business outcomes. This capability enables service models and provision plans that are aligned with relevant business architectures, strategies/goals, and the associated performance management framework. The business services portfolio provides a top down view of enterprise capabilities that are cataloged as business services. In the simplest sense, the business services portfolio can be thought of as a catalog of services, organization units, processes, and assets.

The business model provides a contextual view of how the different strategies, services, processes, and assets come together. The business services portfolio provides a structured catalog of all of these. The details of the services, processes, and the like are dealt with through service portfolio management, discussed in further detail below. Accordingly, the business services portfolio remains the same, even if the business model were to change. Using the business services portfolio, the enterprise can add, delete, and/or modify parts of the business model. Consequently, the business Service portfolio drives the reusability aspect of business modeling within the integrated framework 10 of the present disclosure.

As discussed above, the business services portfolio provides a catalog of business services, which can be defined as any service provided by the enterprise that is of value to the customer. A business service includes a process, which is a set of activities. Each activity can be performed using at least a workforce, system(s), and policy. Further, all the component groups, components, and partner services needed for business and operational modeling are also provided in the business services portfolio.

The services can be classified according to needs of the enterprise, and the classification can vary from that of the business model hierarchical classification of services, discussed above. For example, business service classifications include, but are not limited to, principle, supporting, and elemental. Principle services are those that are provided directly to the customer. Supporting services are those that are not directly related to the customer, but support the principle services. The supporting services are executed, through one or more elemental business services, which are directly performed by workforce, systems, and policy. It should be noted that elemental business services may be channel dependent (e.g., face to face, mail, fax, phone, email, and the like). The business service classifications are not totally independent. A service can be classified under two different classifications.

The business services portfolio is hierarchically organized through a tree structure with one top-level organization and many child organization units. The child organization units can also have lower child organization units, and so forth. Each level of the hierarchy includes a set of job functions that are shared amongst all units at that level and lower. For example, an administration job function can be a shared job function at the top organization level. Each level of the hierarchy also includes a set of internal job functions that are internal only to that organization unit, and that are not shared across organization units. Processes are also cataloged in the business services portfolio, and include a decomposition, whereby the actual process forms a root with sub-processes at the next level, and activity as its leaf. It is possible that a leaf for one person can be an entire process for another. Consequently, it is up to the enterprise to decide the level of detail of the process decomposition. It is also possible that the entire process, or just a leaf of a process is performed by a partner service.

The business services portfolio further provides an assets catalog, which functions as a storehouse of all the details of the assets of an enterprise. The business services portfolio is well organized into asset categories, so that assets are easily searchable based on a particular category. During business modeling within the integrated framework 10 of the present disclosure, assets can be linked to one or more business components depending on the needs of the enterprise. The specification of categories depends on the enterprise. Further, an asset category can include sub-categories. Exemplar asset categories include, but are not limited to, computer hardware, computer software, telephony, and/or training curriculum. Having defined the asset categories, the assets are organized under each asset category and/or subcategory. Within the integrated framework of the present disclosure, an asset can be linked to the vendor that supplies the particular asset, can have a maintenance contract (e.g., warranty, annual), can be leased, or owned, can be linked to business components and asset cost. Each asset can belong to more than one asset category. Further, assets can have dependencies with other assets.

In short, the business services portfolio of the integrated framework of the present disclosure provides the enterprise with the ability to catalog all of its services, organization units, processes, and assets. In a service-oriented business modeling approach, this is a very important and useful tool that can be used for easy reusability and accountability of the enterprise resources. Ultimately, the business services profile helps to create and manage a successful business model without wasting valuable resources.

The operational performance knowledgebase sub-component 72 contains the knowledge of best practices, and rules of thumb in running operations. The performance knowledgebase builds over time, and becomes more and more like a handbook of solutions for problems encountered in day-to-day operations that must not be interrupted or wait for approval of solution implementation.

The operations planning component 42 further includes the strategic initiatives management sub-component 74, and the operational change plan sub-component 76. The strategic initiatives management sub-component 74 contains a list of initiatives, an implementation schedule, allocated resources, and timelines to change the business at a strategic level. These can range from small changes to much larger changes in the system that affects the strategic framework. The operational change plan sub-component 76 contains a list of initiatives, implementation schedule, allocated resources, and timelines to change the business at an operations level, without changing the overall business structure or strategy. These can range from small changes to much larger changes in the system that affect only the operational framework.

Once the operations model is ready, and the strategic initiatives and operations have been determined, the strategic initiatives and operations can be put into effect through agreements with partners and/or customers. An agreement is an arrangement between two or more parties regarding a course of action, and defines terms and conditions. The agreement may be a contract, for example, that is written and enforceable. Agreements should be detailed enough to provide metrics for determining the compliance to the agreement. There are various types of agreements including, but not limited to, a business process outsourcing (BPO) contract, an interagency contract, a maintenance contract, and a licensing contract. A BPO contract is generated when a core enterprise operation is outsourced. An interagency contract is an agreement between departments, or agencies within the enterprise. For example, the shipping department and the sales department of a certain enterprise can have specific SLAs, discussed above and in further detail below, that form an interagency contract. One of the SLAs could be that an item has to be shipped within a specified number of days, once an order is received.

An agreement can include, but is not limited to, one or more of the following sections: agreement details, participants, milestones and phases, personnel, proposed revisions and dependencies. The agreement details provide information regarding the title of the agreement, description, type of agreement, linked program, initiation date, name of the administrator, timelines for the agreement, and the status of the agreement. Further, the agreement details contain information regarding enabled business services, as well as any extensions of timelines specified in addition to the base contract terms. Participants are the parties, between which the agreement is made. An agreement is usually between two parties (e.g., a service provider and a customer), but there can be more. The parties could define a more complex structure including sub-contractors, third parties, and stakeholders. For example, an enterprise can have multiple sub-contractors providing a service with possible third-party involvement. An exemplar instance can be an agreement between a service provider and customer, where the parties engage a neutral third party to monitor their performance.

A milestone is a significant event in the on-going services, while a phase is a stage, or defined time-period of the services. For example, if the service is to build a call center, the construction of the call center can occur in multiple phases (e.g., Phase 1—start in a small region, or only answer a specific type of call, Phase 2—further expansion of the call center, or type of calls). In each of the phases, there can be one, or more milestones. For example, one milestone can be the signing of a lease, another milestone can be the completion of staffing, and still another milestone can be the completion of training. The integrated framework of the present disclosure enables each milestone to have an associated alert so that recipients of the alert can receive notifications on a particular date, or a few days before/after the milestone date is reached. The recipients can be individual recipients, or role based. Personnel are the main personnel involved in the contract, and certain personnel can be identified as key personnel. If a person is designated as the key personnel, certain restrictions are placed on the service provider. For example, the service provider cannot change the key personnel arbitrarily, and must obtain approval from the customer to remove, or add key personnel.

Once an agreement is live, people may have suggestions on how it could have been done better, or additional factors that need to be taken care of before a deliverable. These factors are documented in the proposed revisions by personnel involved along with the amendment number and timeline like date incorporated for such proposals. The actual revision takes place after the documentation. Dependencies are a key concept in agreements. In the BSO world, a contract with a vendor is generally not wholly independent. For example, there can be an agreement between the enterprise and first supplier, as well as between the enterprise and a second supplier. At the same time, there can be a dependency between the first and second suppliers, such that the first supplier cannot meet its deadline if the second supplier does not deliver its services on time. Accordingly, suppliers can be linked through the enterprise, and through the agreements with the enterprise. These dependencies are important to know and track, because the enterprise will need to know the impact on other agreements that are dependent on, or required for a particular agreement, if the enterprise would like to renew the agreement, or discard the agreement.

As discussed above, an SLA is a contract between a service provider and an end user, which stipulates and commits the service provider to a required level of service. An SLA should include a specified level of service, support options, enforcement or penalty provisions for services not provided, a guaranteed level of service performance as relates to downtime or uptime, a specified level of customer support, and what software/hardware will be provided and for what fee. An SLA can be between the enterprise and partner, where the enterprise monitors the performance of the partner service. In this case, the SLA's are defined under agreements, and are all contractual in nature. This means that there can be incentives or penalties associated with the agreement, which depend on the compliance, or non-compliance of the partner. An SLA can also be between the enterprise and customer, where the enterprise monitors its own performance to see if it meets the customer requirements.

SLAs enable performance management. Service levels, expectations, and corrective actions are defined within an SLA, and these are monitored to determine how well the enterprise is performing. The performance of the enterprise can be viewed from different perspectives. For example, a contract manager may only be concerned with how well his particular contract is performing, how well the vendor associated with that contract is performing. An operations manager, may only be interested in how well the operations are performing, and may be less interested in how well the contract is performing. A senior executive, on the other hand, may be interested in how well the overall program, or overall business component is performing, and is less concerned with the performance of the individual contracts. Therefore, the integrated framework 10 of the present disclosure Iinks an SLA to various entities, so that an SLA can be viewed from various dimensions during monitoring.

An SLA can be contractual, or non-contractual in nature. A contractual SLA is binding and, as a result, is tied to an agreement. A non-contractual SLA is just monitored. An SLA includes, but is not limited to, the following exemplar parts: SLA details, corrective actions, alerts, and dependencies. SLAs can be of different types including, but not limited to, a critical service level SLA, a critical deliverable SLA, a key service level SLA, a key metric SLA, and an "other" SLA. SLAs further include a measure direction, a measure type, a status and optional derived expression, first and last measurement dates, and a last published date. The SLA value can be determined based on other SLAs, in which case, a derived expression can be used.

The measure direction of an SLA can be, for example, higher is better, lower is better, within range, or use comparator. The term "higher is better" indicates that the higher the actual value of the SLA is, as compared to the expected measure, the better. The term "lower is better" indicates that the lower the actual value of the SLA is, as compared to the expected measure, the better. With regard to the term "within range", if the SLA's value lies within a pre-defined range, the SLA is compliant. The value can also be compared (e.g., $<, \leq, >, \geq, =$) to a threshold value to determine compliance. A measure type can include, but is not limited to, numbers, dates, percentages, or dollar amounts. The SLA status includes, but is not limited to, initial, draft, approved, active, discarded, inactive, archived, or just a template, for example.

SLA expected measures are the expected values of an SLA that determine compliance of the enterprise to the SLA. If these values are not met, non-compliance is indicated. These measures have a timeline, and are measured periodically. Exemplar periods include, but are not limited to, daily, weekly, bi-weekly, semi-monthly, monthly, bi-monthly, quarterly, semiannually, annually, and once. Each SLA expected measure includes a unit of measure, and whether the expected value is a range or value. Optionally, benchmark values can be specified, which are basically competitor values. An SLA time period defines the period of time, over which the SLA value is determined. The SLA time period can be daily, weekly, bi-weekly, semi-monthly, monthly, bi-monthly, quarterly, semi-annually, annually, and/or once, by way of non-limiting example. An SLA frequency defines how often the SLA value is updated. For example, the SLA time period could be weekly, whereby the SLA value is determined a specific range. The SLA frequency could be daily, for example, whereby the system is updated every day.

SLA corrective actions define the financial impact of compliance or non-compliance of an SLA. Corrective actions can be penalties or incentives depending on the type of agreement violation, or enhanced service performance delivery, respectively. When defining a corrective action, the SLA range is initially specified, and serves to capture the expected values/ranges of the SLA, and the time period over which this range is applicable. What corrective actions need to be taken for each SLA range are then defined. For example, if the actual value of the SLA exceeds expectations, an incentive is provided. If the SLA does not meet expectations, a penalty is provided. The corrective action can be financial in nature, and/or a custom action. When the corrective action is financial in nature, the penalty can be liquidated damages, or a holdback penalty, for example. Liquidated damages indicate that the enterprise calculates the degree of non-compliance, and specifies an amount that the vendor owes the enterprise, after payment is made to the vendor. In some cases, this amount can be more than what was paid to the vendor by the enterprise for the service, for example. A holdback penalty is when a certain amount is held back from the vendor before payment for the services. When the corrective action is financial in nature, the incentive can be an earnback incentive, or an additional incentive. An earnback incentive is one where the vendor can save the incentive to offset against an anticipated, or future penalty. In such a case, there is no cash benefit. An additional incentive simply indicates a cash incentive.

The corrective action can be provided as a dollar amount, or a percentage, for example. If the corrective action is defined as a percentage, the at risk percentage is used to calculate the penalty. By way of non-limiting example, there can be a monthly service fee that a service provider charges for delivering some service. That fee is normally paid every month as long as the SLAs are being met. If the SLA is not met, a predefined percent of the service is at risk for a penalty payment. The at risk percentage is this percent of the service fee, or payment that is at risk of not being paid for not meeting the SLA at the range indicated.

Different SLA ranges can be defined based on the severity of non-compliance. For each SLA range, one or more corrective actions can be defined along with the specific action to be taken for each occurrence. The penalty can be determined based on the number of occurrences. For example, the first time a vendor fails to meet expectations, there can be a penalty of $1000. The penalty could increase for each additional occurrence (e.g., the remedy amount is $2000 with the second occurrence). In an alternative implementation, the penalty can be the same for a threshold number of occurrences (e.g., five occurrences). When the threshold number of occurrences has been exceeded, the penalty for each occurrence above the threshold can increase. Accordingly, the scaling factors for penalties include, but are not limited to, flat (e.g., same remedy amount for any number of occurrences), linear (e.g., the remedy amount increases with each occurrence), and user-defined (e.g., the enterprise can define its own remedy amount for each occurrence).

Other components of an SLA can include alerts and dependencies. Each SLA can have one or more alerts setup. Once an alert is generated, a recipient receives a notification (e.g., by telephone, email, pager, or the like). By way of non-limiting example, an alert can be generated when a particular value falls below or exceeds a threshold. The recipients can be individual named, or can be role based. Although an SLA can be totally independent, the integrated framework of the present disclosure enables SLA's to be linked. By establishing dependencies between SLAs, monitoring can be improved. For example, if an SLA is not compliant, the impact of this non-compliance on other, linked SLAs can be determined. Further, the reason a particular SLA is non-compliant may be the result of another, dependent SLA.

Once the strategic operations and initiatives have been put into place based on the operations model(s), the enterprise operations are executed. That is to say that the enterprise operations are put into action in support of the enterprise's mission and vision, and to meet the goals and objectives set by the enterprise. Upon executing the enterprise operations in accordance with the developed business model(s), the integrated framework of the present disclosure enables the performance of the enterprise to be monitored and governed. Monitoring can occur using the defined SLAs as its foundation. Governance deals with optimization and forecasting using the performance data that is collected during monitoring. Furthermore, although governance deals with change management, governance also concerns how to make changes to the system in an appropriate workflow or governing process once the changes are identified.

With continued reference to FIG. 2, the monitoring component 44 monitors the enterprise operations upon execution thereof. The monitoring component 44 includes a business performance measuring and monitoring sub-component 80 and an analysis subcomponent 82. The business performance measuring and monitoring sub-component 80 provides feedback to the operations planning group 73 of the business planning and operations planning components 40, 42. The analysis sub-component 82 provides and receives feedback from the operations planning group 73. In this manner, the operations planning and monitoring components 42, 44 are interlinked.

Business monitoring is an important component of the integrated framework of the present disclosure, and is a fundamental requirement of business planners, including business executives, corporate officers, and strategic partners. There are at least two areas that are of interest in terms of business monitoring. These areas include SLAs (i.e., how is the enterprise performing with respect to the SLAs), and performance reports. A variety of dimensions can be monitored including, but not limited to, different perspectives of the balanced scorecard (e.g., financial, customer, internal, learning and growth, asset), dashboards, and performance reports. A dashboard provides a graphical view of the enterprise's performance and can include, but are not limited to, tactical dashboards and daily dashboards. Besides performance reports, the integrated framework of the present disclosure can also provide operational reports.

The monitoring component 44 not only enables one to see how the enterprise is currently performing, but also enables one to view past and future trends. Monitoring involves checking SLA actual values against specific performance benchmarks, and business capability levels. Monitoring further involves forecasting, and viewing business model and vendor performance reports. The integrated framework of the present disclosure provides a series of monitoring tools that includes, but is not limited to, executive decision support, the dashboards, and the reports. Each of these tools is based on the aggregation of SLA data into a single compliance percentage. SLAs are grouped under different dimensions including, but not limited to, agreements, perspectives, programs, services, KPIs, customers and partners. Accordingly, the performance can be monitored from each of these dimensions. In one embodiment compliance with an SLA is calculated by aggregating the actual values across each of these dimensions. By way of non-limiting example, if 10 SLAs out of 20 SLAs in a particular program are non-compliant, then the program is said to be only 50% compliant.

Executive decision support can encompass the balanced scorecard, and predictive analytics, for example. In business planning, the balanced scorecard is used to group the business strategies according to different perspectives. SLAs are defined, and are linked back to the strategies. Using the monitoring component, the performance of each SLA can be viewed according to different perspectives. It is also possible to drill-down into the performance data to view the perspectives in terms of each program, performance category, functional category, or any other category. By drilling down, all the compliant, non-compliant, and not reported SLAs can be graphically viewed (e.g., in the form of a pie chart). It is possible to further drill-down to see the values of each SLA and the dependencies of the individual SLAs. The trend of SLAs can be used to view the past trend of SLAs. A probability distribution can be generated and can be used to predict future ranges, or to govern changes to expected values or corrective action ranges.

Dashboards provide a graphical overview of the SLAs that are pertinent for the selected business context, such as a specific contract, or a specific business service. Dashboards increase an enterprise's ability to proactively make decisions that positively impact business performance. In the integrated framework of the present disclosure, there are different ways to classify dashboards. Some of these include daily vs. tactical dashboards, operational vs. business model vs. balanced scorecard based dashboards, and strategic vs. tactical vs. daily dashboards. The choice of the particular dashboard or dashboards depends upon the preference of the particular enterprise. It should be noted that there is the possibility of overlapping information across the different dashboards.

Performance measurements that are generally made on a periodic basis (e.g., weekly, monthly) are shown on a tactical dashboard. The tactical dashboards can be further classified into service levels, key performance indicators (KPIs), and key performance metrics (KPMs). Performance measurements that are generally made on a shorter periodic basis (e.g., daily) are shown on a daily dashboard. The SLAs can be viewed on the daily dashboard according to KPMs. and business components, for example.

Reports provide a single overall view of the monthly, quarterly, or yearly performance, for example, of a particular business model and/or partner from various perspectives. Reports are static for a specific time-period, whereas dashboards provide realtime data that is independent of the time-period of the SLAs. There are several reports that can be accessed within the integrated framework of the present disclosure. For example, a performance report can be provided for the business model and/or the vendors. The business model performance report provides a summary of the compliance of business components, programs, balanced scorecard, the fiscal year to date (FYTD) KPI financial impact, and the FYTD SLA financial impact. Similarly, the vendor performance report provides a summary of services provided by the vendor/partner in terms of SLA compliance, SLA violation, and financial impact.

In summary, the monitoring component 44 aggregates, analyzes, and presents realtime information about SLA, business models, contract agreements, operations, workforce, and assets using easy to understand executive, contract and operational dashboards. It also presents past and future trends to help executives take informed decisions about achieving the vision, mission, and strategies of the enterprise. The monitoring component 44 provides the data input for the governance component, discussed in further detail below.

With continued reference to FIG. 2, the governance component 46 includes manage and govern sub-components 90*a*, 90*b*, a strategic initiatives implementation sub-component 92, and an operational/performance change implementation sub-component 94. The manage and govern sub-components 90*a*, 90*b* are interlinked with the strategic initiatives implementation sub-component 92, and the operational/performance change implementation sub-component 94, respectively. The strategic initiatives implementation sub-component 92 receives input from the strategic initiatives management sub-component 74 of the operations planning component 42, and provides an input to the business performance measuring and monitoring sub-component 80 of the monitoring component 44. The operational/performance changes implementation sub-component 94 receives input from the operational change plan sub-component 76 of the operations planning component 42, and the analysis component 82 of the monitoring component 44, and provides an input to the business performance measuring and monitoring sub-component 80 of the monitoring component 44. Consequently, the various links between the sub-components provide interlinking and integration of the business planning, operations planning, monitoring, and governance components 40, 42, 44, 46. As described in further detail below, the enterprise is able to manage change, is provided with feedback, and is consequently better able to achieve its mission and vision using the governance component 46.

One of the biggest challenges of many enterprises is managing change. The governance component 46 enables the enterprise to manage change by optimizing, and forecasting so that the change results in continuous performance improvement. Change management involves making revisions to SLA expected values, corrective actions of SLAs, alerts, dependencies, associations to dimensions of an SLA, and dimensions of SLAs including, but not limited to, agreements, KPIs, strategies, services, business components, and the like. After these changes are made, the SLAs are republished for business monitoring. A probability distribution can be used for calculating confidence intervals, or ranges for an SLA. These ranges can be used as a basis for specifying the SLA ranges for rewards and penalties. By way of non-limiting example, a 95% range can indicate that a future value will be bound within this range with a confidence level of 95%. Probability distribution is also used for predicting how well a particular SLA is likely to perform, and hence can be used as an input to make changes to an SLA.

Predictive analytics is a statistical analysis tool that can be implemented with the integrated framework of the present disclosure, Predictive analytics uses historical and current data to identify future business risks and opportunities. These analyses weigh the relationship between several data elements to isolate each risk or potential. The risks and/or potentials can serve to guide the future actions of the enterprise. By way of non-limiting example, future customer satisfaction can be predicted by using the current customer usage data. The factors that contribute to the results of the predictive analytics can be modified to perform a 'what-if type' of analysis to determine the impact of making these changes. Depending on the trend, the enterprise can take the necessary steps to retain the customer base.

Optimization is the process of seeking the most favorable condition, or solution to a goal by balancing the trade-off results on more than one criterion. In practical implementation, optimization is a systematic procedure of modifying a system to make it work more efficiently in some sense, and/or to use fewer resources. Optimization, however, is often not an obvious or even intuitive process to visualize and implement. Optimization can be described as the process of finding a set of practicable decisions, among many, that leads to desired consequences in the best manner. Optimization not only guides the enterprise in achieving it's objectives, but also answers some critical questions about the decisions made and their consequences. Some exemplar questions include: Is it possible to achieve the objectives or should the plan change?; What is possible?; How can the enterprise do better?; What if the enterprise had more money and/or time?; What is the cost of a given restriction?; and How good is the enterprise's direction? Some of these questions can change the enterprise's perspective immensely, and, in certain situations, it is absolutely necessary to know answers to these questions before any decisions can be implemented.

Referring now to FIGS. 3 through 6, the integrated framework of the present disclosure can be implemented through software that is executed on a computer system, and/or over a network of interlinked computer systems. The software: can include a series of software modules having sub-modules, as discussed in further detail below.

Figure 3:
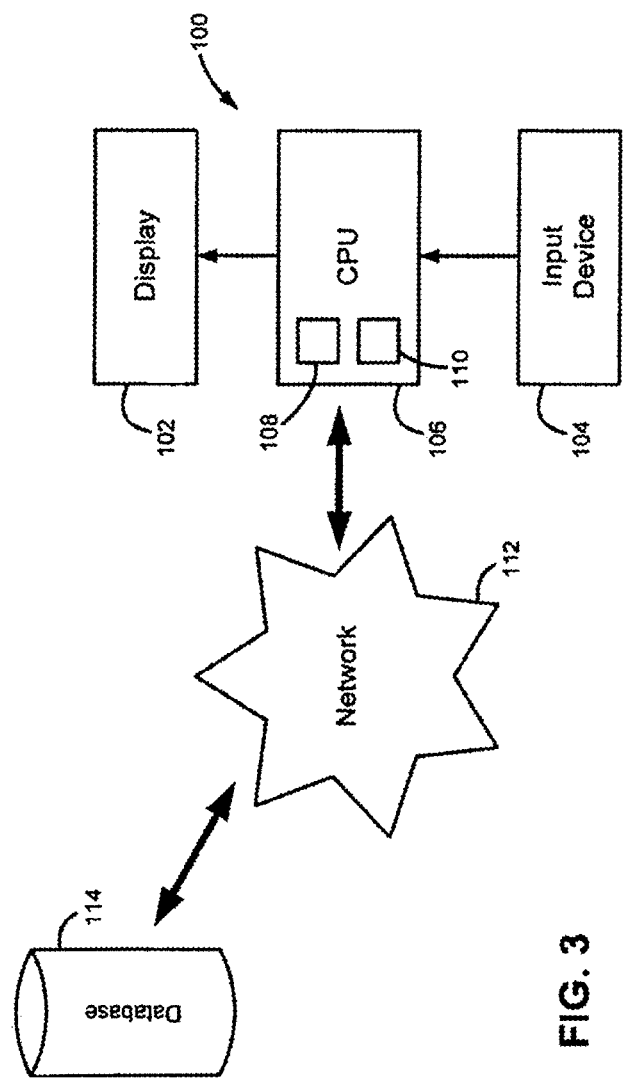
FIG. 3 is a functional block diagram of an exemplar computer system that can execute the integrated framework of the present disclosure.

With particular reference to FIG. 3, an exemplar computer system 100 is illustrated. The exemplar computer system 100 includes a display 102, an input device 104, and a central processing unit (CPU) 106 that includes one or more micro-processors 108 and memory 110. The input device 104 can include, but is not limited to a keyboard, a mouse, a touch-pad and/or screen, and a microphone, and enables a user to input user data. The display 102 can provide a graphical user interface (GUI) for the user to interact with the computer system 100, and to operate the software. The computer system 100 can communicate with a network 112 that includes, but is not limited to, the Internet (i.e., the world-wide web), a local area network (LAN), a wireless local area network (WLAN), and/or a wide area network (WAN), for example. Furthermore, a database 114 is provided, and stores performance related data that is gathered during the monitoring stage 22 (FIG. 1), described in detail above. The database 114 can be stored on a server (not shown), for example, that is accessible over the network 112, as illustrated in FIG. 3. In an alternative implementation, the database 114 can be stored in the memory 110 of the computer system 100, and can be accessed by other systems over the network 112.

The software that embodies the integrated framework of the present disclosure can be executed on the computer system 100 alone, or can be executed across the network 112 using the various computer systems and/or other components (e.g., servers) that communicate over the network 112. By way of non-limiting example, the computer system 100 can execute the integrated framework, while a remote computer system (not shown) that is linked over the network, can be used by an executive of the enterprise to view a dashboard and/or to view or print a report based on the gathered performance data stored in the database 114. As described in further detail below, the software enables the user to input various data that is implemented across the integrated framework of the present disclosure. The data can be used to define an enterprise pro ti le, and can be stored in the memory of the computer system, and/or in another memory (not shown) that is accessible over the network.

The integrated framework can be provided as a computer program product that is tangibly embodied in a machine-readable storage device that can include, but is not limited to, the memory 110. The computer program product can deploy the software to the computer system 100. The computer program product includes instructions that are operable to cause the computer to execute one or more, or a combination of the features of the integrated framework described herein.

Figure 4:
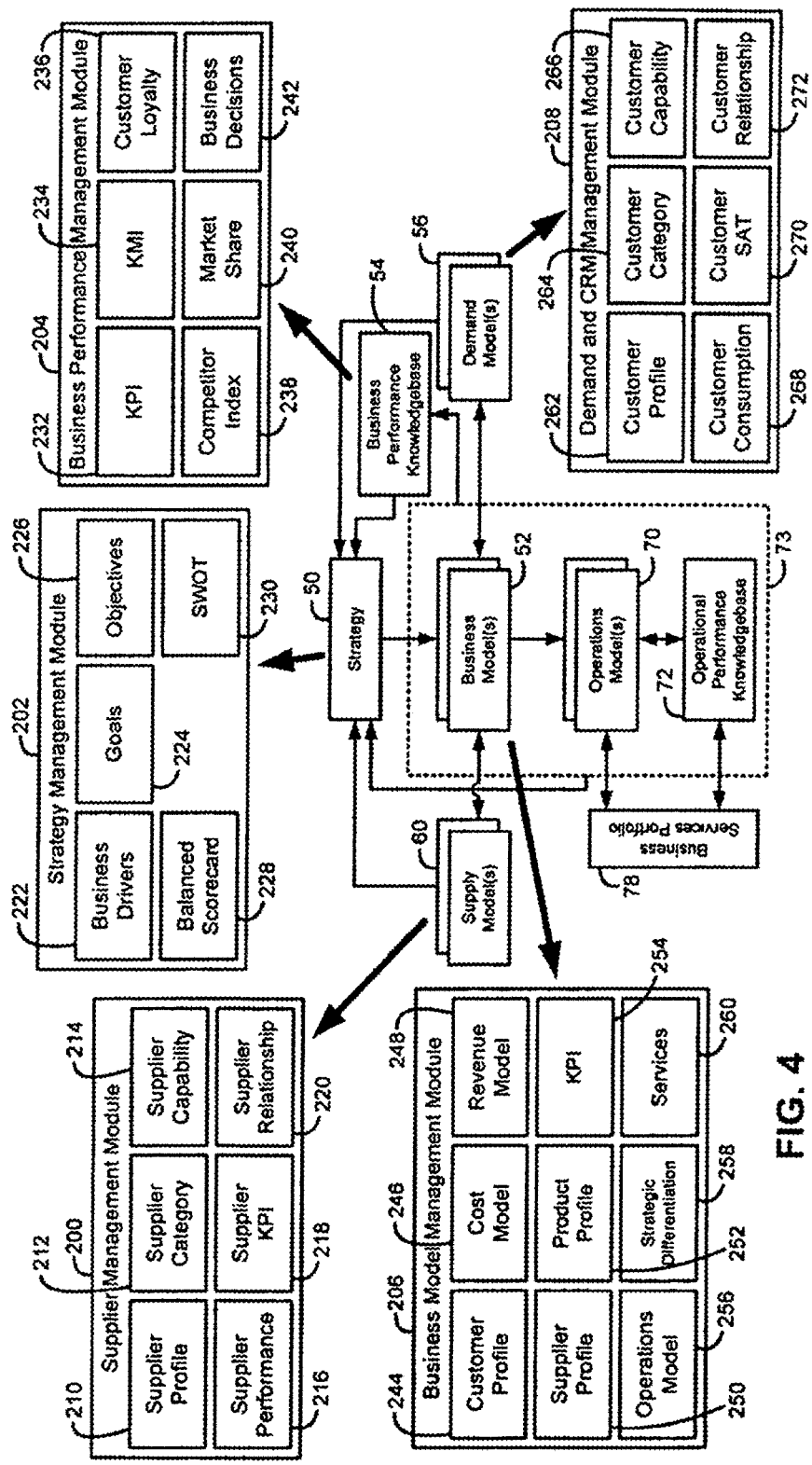
FIG. 4 is a block diagram that illustrates exemplar software modules that regulate a business planning stage of the integrated framework of the present disclosure.

With particular reference to FIG. 4, the software includes a supplier management module 200, a strategy management module 202, a business performance management module 204, a business model management module 206, and a demand and CRM management module 208, all of which are associated with the business planning component 40. More specifically, the supplier management module 200 is associated with the supply model sub-component 60, the strategy management module 202 is associated with the strategy sub-component 50, the business performance management module 204 is associated with the business performance knowledgebase sub-component 54, the business model management component 206 is associated with the business model sub-component 52, and the demand an CRM management module 208 is associated with the demand model subcomponent 56.

The supplier management module 200 enables a user to input supplier-related data and to associate, or link the supplier-related data to other data described herein. More specifically, the supplier management module 200 has a plurality of sub-modules including, but not limited to, a supplier profile sub-module 210, a supplier category sub-module 212, a supplier capability sub-module 214, a supplier performance sub-module 216, a supplier KPI sub-module 218, and a supplier relationship sub-module 220. Each of the sub-modules defined herein generally refers to a repository, however, each can also include the management and/or maintenance of the repository, information in the repository, and/or cross-dependencies and relationships.

The supplier profile sub-module 210 contains an inventory of supplier profiles each containing supplier information including, but not limited to, name, address, contact person, description of product or services they provide, annual sales, warehouse location, website, service area, total employee and/or any other relevant information. The supplier category sub-module 212 contains a classification or clustering scheme of suppliers on the basis of location, product, services, or any of the specified criteria, for example. The supplier capability sub-module 214 contains the knowledge about each suppliers' capability in terms of scale and scope of the product, and services they can provide. Scale, for example, is the quantitative measure of the particular supplier's capability (e.g., size of the contract they can honor. Scope, for example, is the qualitative measure of the particular supplier's capability (e.g., reliability, variety, diversity, timeliness, compatibility). The supplier performance submodule 216 contains business specified measure of past performance in terms of scope mentioned above. The supplier KPI sub-module 218 contains supplier specified measures of their performance in terms of the scope, as discussed above. The supplier relationship submodule 220 contains information about any past relationship with the supplier (e.g., dates, duration, product, services, cost, performance, feedback).

The strategy management module 202 enables the user to input strategy-related data including, but not limited to the strategies, direction, and goals of the enterprise. The strategy management module 202 further enables the user to link the strategies, direction, and goals data with other data that is input using the other module, and/or sub-modules described herein. The strategy management module 202 has a plurality of sub-modules including, but not limited to, a business drivers sub-module 222, a goals sub-module 224, an objectives sub-module 226, a balanced scorecard sub-module 228, and a SWOT sub-module 230. The business drivers sub-module 222 is a repository of the key business drivers that are external or internal influences that impact the business (e.g., reaction to economy, internal strategic changes, market growth, market share growth, net sales, prior years sales, gross profit, marketing expenditure, and margins, for example). The goals sub-module 224 is a repository of the strategic goals identified by business governing body. The goals can be identified by as a subset of business drivers. By way of non-limiting example, increasing market share, reducing internal expenditure, implementing recommendations for internal changes can be goals. The objectives sub-module 226 can contain the list of objectives for each goal. For example, the goal of increasing market share can be broken down into several smaller projects with respective objectives. By way of non-limiting example, if adding a new feature to a product or service will lead to capturing more market-share, then adding such a feature in the product or service can be an objective. The balanced scorecard sub-module 228 incorporates all quantitative and abstract measures of true importance to the business or enterprise. Factors in a plurality of specified perspectives (e.g., "Financial", "Customer", "Internal Business Processes", and "Learning and Growth") can be identified and monitored. The SWOT sub-module 230 provides is an analysis tool for strategic planning that can be used to evaluate the strengths, weaknesses, opportunities, and threats involved in a project or in a business venture. A comprehensive list of all factors—that signify strengths, weaknesses, opportunities, and threats can be identified and used for planning purposes.

The business performance management module 204 enables a user to input business performance data, and enables the user to link the business performance data with other data that is input using the various modules, and sub-modules described herein. The business performance management module 204 has a plurality of sub-modules that include, but are not limited to, a KPI sub-module 232, a KMI sub-module 234, a customer loyalty sub-module 236, a competitor index sub-module 238, a market share sub-module 240, and a business decisions sub-module 242. The KPI sub-module 232 provides a repository of financial and non-financial metrics identified to measure the business performance. Examples can include, but are not limited to, net sales in last year, profit/revenue ratio, and customer satisfaction. The KMI sub-module 234 provides a repository of KPrs with an emphasis on marketing (e.g., market share, marketing expenditure, and market share growth factors). The customer loyalty sub-module 236 provides a repository of metrics used to measure customer loyalty. Exemplary metrics include, but are not limited to, the ratio of renewed contract to total number of contracts, and/or new contracts within a predetermined time period (e.g., within the last year). The competitor index sub-module 238 provides a repository of metrics to compare competitors' business performance to the performance of the current business (e.g., weighted sum of ratios of selected KPI's). The market share sub-module 240 provides a measure of the percentage, or proportion of the total available market or market segment that is being serviced by the business. The business decisions sub-module 242 provides a repository of business decisions taken in the past and a detailed analysis of their impact on the business performance.

The business model management module 206 enables the user to input business model related data, and enables the user to link the business model d4ta with other data that is input using the various modules, and sub-modules described herein. The business model management module 206 has a plurality of sub-modules that can include, but are not limited to, a customer profile sub-module 244, a cost model sub-module 246, a revenue model submodule 248, a supplier profile sub-module 250, a product profile sub-module 252, a KPI sub-module 254, an operations model sub-module 256, a strategic differentiation sub-module 258, and a services sub-module 260. The customer profile sub-module 244 provides a repository of customer profiles, which can include information including, but not limited to, name, organization, contact, contact person, website, annual budget, and/or past relationships. The cost model sub-module 246 provides a repository of cost models (e.g., tariffs) developed or used in the past to bill a customer. These can be standard models that are accepted in the industry and known to have worked well in the past. The revenue model sub-module 248 provides a repository of revenue models developed or used in the past to track, accumulate, and report the revenue from several sources. These can be standard models accepted in the industry and known to have worked well in the past. The supplier profile sub-module 250 provides an inventory of supplier profiles each containing supplier information including, but not limited to, name, address, contact person, description of product or services they provide, annual sales, warehouse location, websites, service area, total employees, or any other relevant information.

The product profile sub-module 252 provides a repository of profiles of products and services offered by a business. A profile can include, but is not limited to, the name, technical information, cost model, contact person, and a web-link. The KPI sub-module 254 provides a repository of financial and non-financial metrics identified for the business performance measurement. Exemplary metrics include, but are not limited to, sales in last year, profit/revenue ratio, and customer satisfaction. The operations model sub-module 256 provides information relating to one or a plurality of suggested operations models, which includes an operational plan and schedule to makes use of common business resources to implement one or more business models. The strategic differentiation sub-module 258 provides a repository of key aspects of the business that differentiate the business from its competitors (e.g., a unique feature, delivery methods, customer service). The services submodule 260 provides a portfolio of services used or offered by a business.

The demand and CRM management module 208 enables the user to input demand and CRM related data, and enables the user to link the demand and CRM data with other data that is input using the various modules, and sub-modules described herein. The demand and CRM management module 208 has a plurality of sub-modules that can include, but are not limited to, a customer profile sub-module 262, a customer category sub-module 264, a customer capability sub-module 266, a customer consumption sub-module 268, a customer satisfaction sub-module 270, and a customer relationship sub-module 272. The customer profile sub-module 262 provides a repository of customer profiles, which can include, but is not limited to, name, organization, contact, contact person, website, annual budget, and past relationships. The customer category sub-module 264 provides a classification and clustering scheme for customer profiles based on one or more criterion specified in customer profile. The customer capability sub-module 266 provides knowledge about each customer's capability in terms of scale and scope, defined above, of the product and services they would request. The customer consumption sub-module. 268 provides the knowledge about each customer's consumption of the products or services requested, and can be specified in percentage of the contracted amount, for example. The customer satisfaction sub-module 270 provides an external business performance metric measured from a survey of customers for their satisfaction of the services they received. The customer relationship sub-module 272 provides a repository of past relationships with customer, timelines, products, services, cost model, and satisfaction score, for example.

Figure 5:
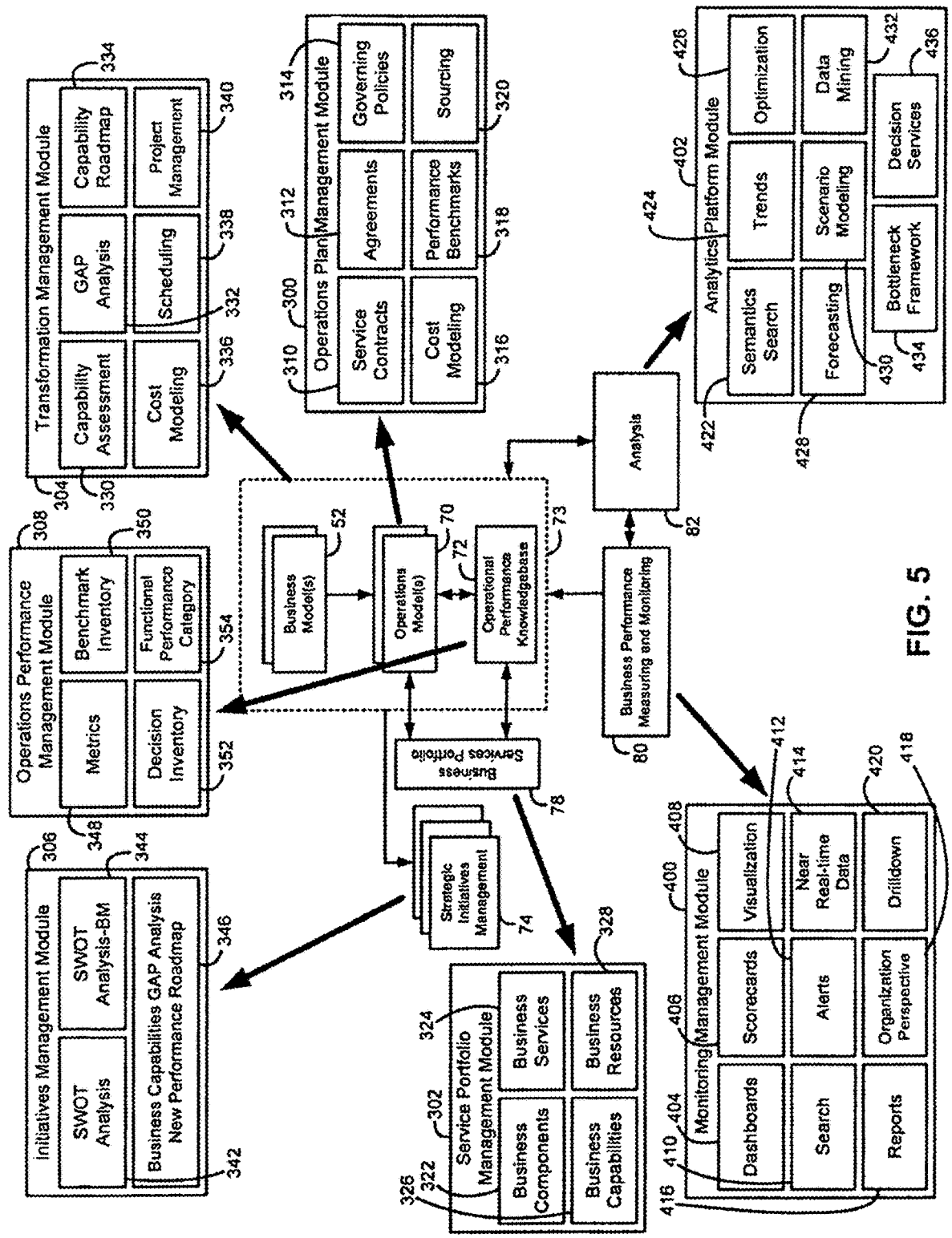
FIG. 5 is a block diagram that illustrates exemplar software modules that regulate operational planning and monitoring stages of the integrated framework of the present disclosure.

Referring now to FIG. 5, the software further includes an operations plan management module 300, a service portfolio management module 302, a transformation management module 304, an initiatives management module 306, and an operations performance management module 308 associated with the operations planning component 42. More specifically, the operations plan management module 300 is associated with the operations model sub-component 70, the service portfolio management module 302 is associated with the business services portfolio sub-component 78, the transformation; management module 304 is associated with operations planning group 73, the initiatives management module 306 is associated with the strategic initiatives management sub-component 74, and the operations performance management module 308 is associated with the operational performance knowledgebase sub-component 72.

The operations plan management module 300 enables the user to input operations plan data, and enables the user to link the operations plan data with other data that is input using the various modules, and sub-modules described herein. The operations plan management module 300 has a plurality of sub-modules that can include, but are not limited to, a service contracts sub-module 310, an agreements sub-module 312, a governing policies sub-module 314, a cost modeling sub-module 316, a performance benchmarks sub-module 318, and a sourcing sub-module 320. The service contracts sub-module 310 retains one or more services contracts, which can be a written agreement between two parties. A services contract details the technical specification, measuring units, cost model, and timelines, for example. The agreements sub-module 312 provides a repository of live contracts and standardized agreements to be used for contracts purposes. The governing policies sub-module 314 provides a set of policies that must be honored in all business transactions and agreements. The cost modeling sub-module 316 provides a methodology of modeling cost to prepare a cost model to be put in contracts. The performance benchmarks sub-module 318 is similar to the KPI sub-module 254 described above. The sourcing sub-module 320 provides a repository of sourcing requirements that must be fulfilled by either1outsourcing or insourcing.

The service portfolio management module 302 enables the user to input data detailing the business services profile, and enables the user to link the business services profile data with other data that is input using the various modules, and sub-modules described herein. The service portfolio management module 302 has a plurality of sub-modules that can include, but are not limited to, a business components sub-module 322, a business services sub-module 324 a business capabilities sub-module 326, and a business resources sub-I module 328. The business components sub-module 322 provides a repository of business components. As discussed above, a business component represents an autonomous business entity that delivers value through its component services, and includes business processes, workforce, IT systems, and business assets that implement functions that are relevant in a business context and provide some business set capability. In short, a business component is the physical, reusable building block of business capability that can be shared across enterprises, or internally across business models. The business services sub-module 324 provides a repository of business services as a function of on-going operations. Objectives can be designed and worded as much as possible to be specific, measurable, acceptable to those working to achieve the goals, realistic, timely, extending the capabilities of those working to achieve the objectives, and rewarding to them, as well. The business capabilities sub-module 326 provides a repository of business capabilities (i.e., the abilities of business to execute some specific course of action to deliver value). Each business capability can be measured in one or more dimensions that are often classified as either scale (i.e., quantitative aspects), and scope (i.e., qualitative aspects), discussed in detail above. The business resources sub-module 328 provides a repository of business resources, which are anything that a business owns or leases. This can include, but is not limited to people, buildings, machines, networks, parking, communication systems, printers, and faxes.

The transformation management module 304 enables the user is to input transformation data, and enables the user to link the transformation data with other data that is input using the various modules, and sub-modules described herein. The transformation management module 304 has a plurality of sub-modules that can include, but are not limited to, a capability assessment sub-module 330, a GAP analysis sub-module 332, a capability roadmap sub-module 334, a cost modeling sub-module 336, a scheduling sub-module 338, and a project management sub-module 340. The capability assessment sub-module 330 can assess, or measure a business capability in one or more dimensions that can be classified as scale, and scope, discussed above. The GAP analysis sub-module 332 provides an analysis of the gap between current and desired (e.g., future) business capability to determine ways to decrease or fill the gap within a given time, budget, and using a set amount of resources. The capability roadmap sub-module 334 provides a time-based plan of business capability, and/or upgrading from current to future capability.

The cost modeling sub-module 336 implements a methodology of modeling cost to prepare a cost model for capability upgrading. The scheduling sub-module 338 provides a repository of scheduling algorithms, which is an appropriate commitment of resources to the realization of an event at a defined time. The project management sub-module 340 provides a project management algorithm for organizing and managing resources (e.g. people, systems, and assets) in such a way that the project is completed within defined scope, quality, time and cost constraints.

The initiatives management module 306 enables the user to input operations and initiatives data, and enables the user to link the demand and operations and initiatives data with other data that is input using the various modules, and sub-modules described herein. The initiatives management module 306 has a plurality of sub-modules that can include, but are not limited to, a SWOT analysis sub-module 342, a SWOT analysis-BM sub-module 344, and a business capabilities GAP analysis and new performance roadmap sub-module 346. The SWOT analysis sub-module 342 is similar to the SWOT sub-module 230, described above. The SWOT analysis-BM sub-module 344 provides the SWOT details for a specified business model. The business capabilities sub-module provides the abilities of business to execute some specific course of action to deliver value. Each business capability can be measured in one or more of the scale, and scope dimensions, discussed above. The GAP analysis sub-module is similar to the GAP analysis sub-module 332, discussed above. The new performance roadmap sub-module 346 provides a time based plot for business performance measured in specified KPI's, while business capabilities are upgraded.

The operations performance management module 308 enables the user to input operations performance data, and enables the user to link the operations performance data with other data that is input using the various modules, and sub-modules described herein. The operations performance management module 308 has a plurality of sub-modules that can include, but are not limited to, a metrics sub-module 348, a benchmark inventory sub-module 350, a decision inventory sub-module 352, and a functional performance category submodule 354. The metrics sub-module 348 provides a repository of metrics that can measure financial, non-financial, quantifiable, or non-quantifiable aspects of business performance. The benchmark inventory sub-module 350 provides industry standards of values assigned to metrics that measure business performance. The decision inventory sub-module 352 provides an inventory of intelligent decisions that have been successful in solving problems (e.g., a handbook of quick problem solving). The functional performance category sub-module 354 provides categories of performance defined as levels (e.g., level 1 to level 5 as increasing order), in which a particular function's performance falls.

With continued reference to FIG. 5, the software also includes a monitoring management module 400 and an analytics platform module 402 that are associated with the monitoring component 44. More specifically, the monitoring management module 400 is associated with the business performance measuring and monitoring sub-component 80, and the analytics platform module 402 is associated with the analysis sub-module 82.

The monitoring management module 400 enables, the user to input monitoring data, and enables the user to link the monitoring data with other data that is input using the various modules, and sub-modules described herein. The monitoring management module 400 has a plurality of sub-modules that can include, but are not limited to, a dashboards sub-module 404, a scorecards sub-module 406, a visualization sub-module 408, a search sub-module 410, an alerts sub-module 412, a near real-time data sub-module 414, a reports sub-module 416, an organization perspective sub-module 418, and a drilldown sub-module 420. The dashboards sub-module 404 provides the dashboard, discussed above which can be a display (e.g., a webpage), on which real time information is displayed from various sources of the business. The dashboard provides a real-time analysis as to how a business is performing. The scorecards sub-module 406 provides dashboard version of the balanced scorecard metrics, and the visualization sub-module 408 provides an application that helps to display data visually as plots, and charts (e.g., histograms and pie-charts).

The search sub-module 410 provides a utility that helps find a relevant page in a repository using keywords, for example, and the alerts sub-module 412 provides alerts or warnings that are generated whenever a metric's current value has gone below a pre-defined threshold. The near real-time data sub-module 414 provides a display (e.g., dashboard) of data that is kept as recent as possible to mimic real-time monitoring. The reports sub-module 416 provides reports of specific instances of the state of the business, which are prepared in an accepted or familiar format. The organization perspective sub-module 418 provides an internal perspective for a performance measure. The drill down sub-module 420 provides a drilldown tool. If representative points for respective phenomena are plotted together, then an investigator's ability to explore each point is the concept of drilldown. In short, drilldown enables one to move from summary information to detailed data by focusing on a specific point.

The analytics platform module 402 enables the user to input analytics data, and enables the user to link the analytics data with other data that is input using the various modules, and sub-modules described herein. The analytics platform module 402 has a plurality of sub-modules that can include, but are not limited to, a semantics search submodule 422, a trends sub-module 424, an optimization sub-module 426, a forecasting sub-module 428, a scenario modeling sub-module 430, a data mining sub-module 432, a bottleneck framework sub-module 434, and a decision services sub-module 436. The semantics search sub-module 422 enables a semantic search that augments and improves traditional searches by leveraging XML and RDF data from semantic networks to disambiguate semantic search queries, and web text in order to increase relevancy of results. The trends sub-module 424 enables exploring trends in the data (e.g., demand) such as cyclic nature, seasonality, correlations, and the like. The optimization sub-module 426 provides a repository of optimization models that can run on different data sets to make better planning decisions.

Figure 6:
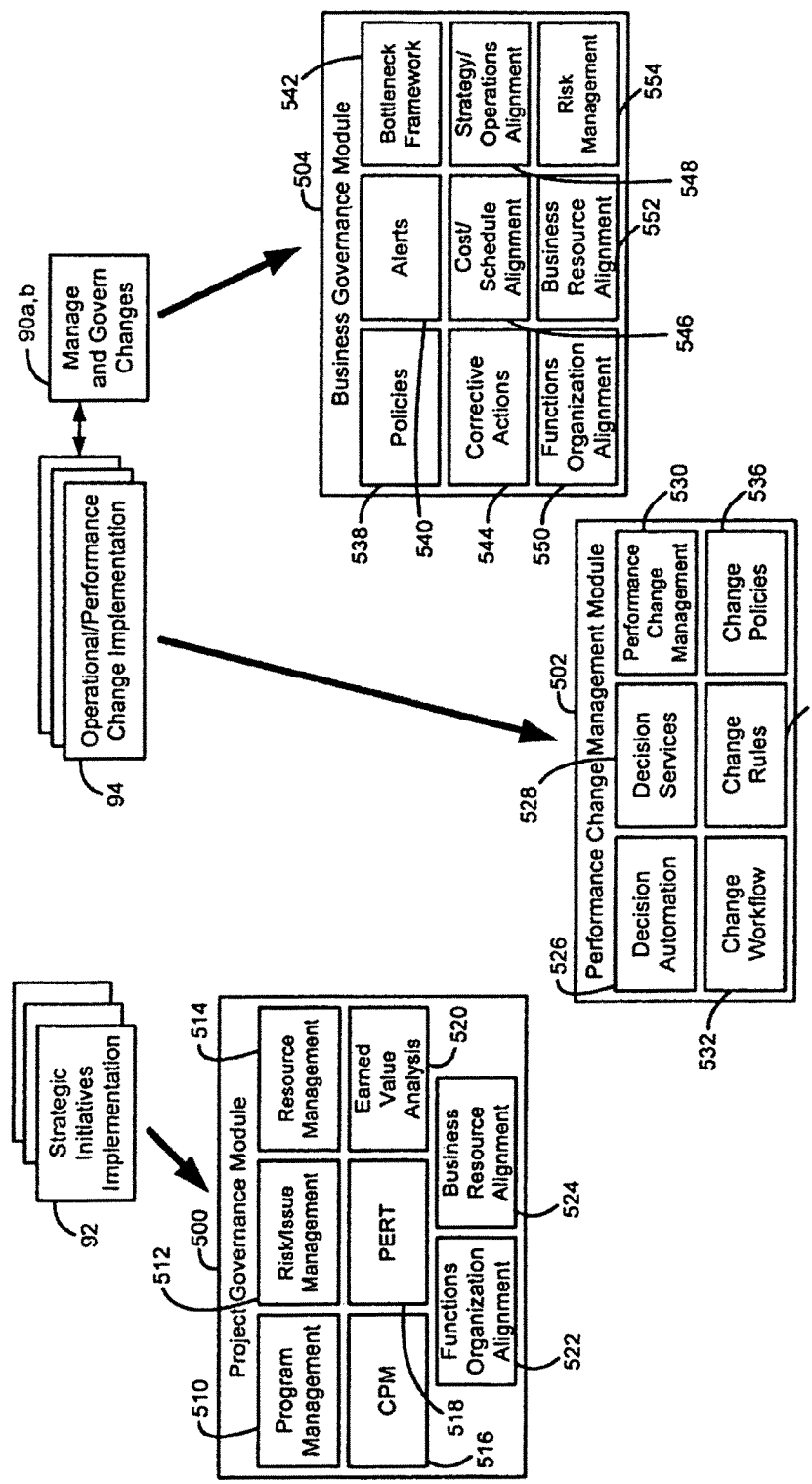
FIG. 6 is a block diagram that illustrates exemplar software modules that regulate an enterprise performance change, management and governance stage of the integrated framework of the present disclosure.

The forecasting sub-module 428 provides a repository of forecasting applications that can be used to make forecast about future trends that can be anticipated. This often helps in planning an unforeseen situation. The scenario modeling sub-module 430 provides a repository of mathematical models that can evaluate multiple scenarios to plan for future events and business performance under uncertainty. The data mining sub-module 432 provides a plurality of applications that can extract information from available data to make inferences. The bottleneck framework sub-module 434 provides a framework that tracks, send alerts, and reports resources that are either a current bottleneck, or that are likely to become a bottleneck in the near future. The decision services sub-module 436 provides a repository of applications that can be used to simulate decisions and test them against the uncertainty. Referring now to FIG. 6, the software further includes a project governance module 500, a performance change management module 502, and a business governance module 504 associated with the governance component 46. More specifically, the project governance module 504 is associated with the strategic initiatives implementation sub-component 92, the performance change management module 502 is associated with the operational/performance change implementation sub-component 94, and the business governance module 504 is associated with the manage and govern changes sub-components 90a, 90b.

The project governance module 500 enables the user to input project governance data, and enables the user to link the project governance data with other data that is input using the various modules, and sub-modules described herein. The project governance module 500 has a plurality of sub-modules that can include, but are not limited to, a program management sub-module 510, a risk/issue management sub-module 512, a resource management sub-module 514, a CPM sub-module 516, a PERT sub-module 518, an earned value analysis sub-module 520, a functions organization alignment sub-module 522, and a business resource alignment sub-module 524. The program management sub-module 510 provides a layer above project management for selecting the best group of programs, defining them in terms of their constituent projects, and providing an infrastructure where projects can be run successfully, while leaving details of the individual project to management. The risk/issue management sub-module 512 provides a utility that can be used to assess, control, minimize, or mitigates risks related to failures, bottlenecking, and the like.

The resource management sub-module 514 supports project management. Shared resources can be at1ended to, and a schedule for sharing, upgrading, retiring, repairing, and/or maintaining shared resources can be defined. The CPM sub-module 516 schedules a set of project activities for effective project management. The PERT sub-module 518 executes the project evaluation and review technique, which is a method to identify the minimum time needed to complete a project. The earned value analysis sub-module 520 executes a project management technique to measure forward progress in an objective manner. The functions organization alignment sub-module 522 aligns different functional capabilities of an organization with it's need. The business resource alignment sub-module 524 provides a schedule of resource utilization to cater the business requirements.

The performance change management module 502 enables the user to input performance change data, and enables the user to link the performance change data with other data that is input using the various modules, and sub-modules described herein. The performance change management module 502 has a plurality of sub-modules that can include, but are not limited to, a decision automation sub-module 526, a decision services sub-module 528, a performance change management sub-module 530, a change work flow sub-module 532, a change rules sub-module 534, and a change policies sub-module 536. The decision automation sub-module 526 automates a plurality of decisions to minimize approval time, for example, during which key resources can be starved and bottlenecks can be created. Such a functionality can be achieved by having a large repository of business decisions. The decision services sub-module 528 corresponds to services in a service oriented architecture (SOA) that automate and manage highly targeted decisions that are part of an organization's day-to-day operations.

The performance change management sub-module 530 executes management of performance expectations and targets. Management can include, but is not limited to, changing or setting levels to be achieved for each and every KPI, and metrics that measure some aspect of business performance. The change workflow sub-module 532 executes management of flow of work, or streamlining to remove bottlenecks, routing, and re-routing. The change rules sub-module 534 adjusts the management of internal rules and regulations that govern day-to-day operations and long term strategies. The change policies sub-module 536 executes the management of external rules and regulations imposed on the business (i.e., policies). The policies can be changed after a recommendation, which based on a rigorous analysis, has been accepted.

The business governance module 504 enables the user to input business governance. data, and enables the user to link the business governance data with other data that is input using the various modules, and sub-modules described herein. The business governance module 504 has a plurality of sub-modules that can include, but are not limited to, a policies sub-module 538, an alerts sub-module 540, a bottleneck framework sub-module 542, a corrective actions sub-module 544, a cost/schedule alignment sub-module 546, a strategy/operations alignment sub-module 548, a functions organization alignment sub; module 550, a business resource alignment sub-module 552, and a risk management sub-module 554. The policies sub-module 538 provides a repository of the external rules and regulation imposed on the business. The alerts sub-module 540 is a repository of messages to be sent/displayed whenever a performance metric falls below, or exceeds a pre-defined threshold.

The bottleneck framework sub-module 542 provides a framework that tracks, sends alerts, and reports the resources that are either a current bottleneck or are likely to become a bottleneck in near future. The corrective actions sub-module 544 executes actions that can correct a situation that needs correction (e.g., augmenting a resource's capacity before it becomes a bottleneck, hiring few more labor people to speed up the work). The cost/schedule alignment sub-module 546 executes corrective actions to align expenditures and their schedule, and the strategy/operations alignment sub-module 548 executes corrective actions that align long term goals/strategies and short term goals/strategies. The functions organization alignment sub-module 550 executes corrective actions that align an organization's higher level goals and routine functions. The business resource alignment sub-module 552 executes corrective actions that align business need and resources, and the risk management sub-module 554 provides a layer above a bottleneck that manages risks identified by the bottleneck framework, and that takes appropriate corrective action(s).

Figure 7:
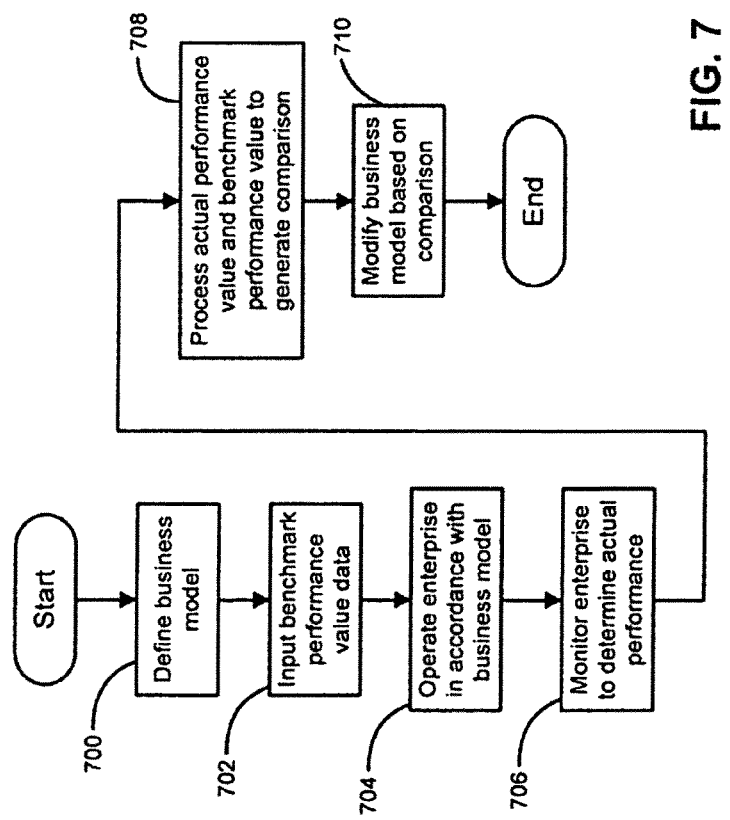
FIG. 7 is a flowchart illustrating exemplar steps that can be executed by an implementation of integrated framework of the present disclosure.

Referring now to FIG. 7, exemplar steps that can be executed by an implementation of integrated framework of the present disclosure will be described. In the implementation of FIG. 7, the flowchart illustrates exemplar steps for implementing and managing a business model of an enterprise. In step 700, a business model is defined using a business model tool that is executed by a computer. As discussed in further detail above, the business model can be based on interrelated business strategy, business goal and business constraint data, and includes a business service. In step 702, a first set of data representing a benchmark performance value of the business service is input into the computer. The enterprise is operated in accordance with the business model in step 704. In step 706, the enterprise is monitored to determine an actual performance value of the business service. In step 708, the actual performance value and the benchmark performance value are processed in the computer to affect a comparison therebetween. The business model is modified based on the comparison in step 710. It is anticipated that the exemplar implementation of the integrated framework described in FIG. 7 can be modified within the scope of the present disclosure to include additional or fewer steps.

Figure 8:
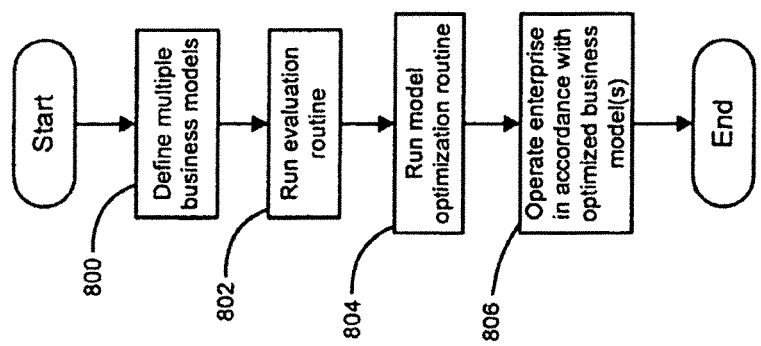
FIG. 8 is a flowchart illustrating exemplar steps that can be executed by another implementation of integrated framework of the present disclosure.

Referring now to FIG. 8, exemplar steps that can be executed by another implementation of integrated framework of the present disclosure will be described. In the implementation of FIG. 8, the flowchart illustrates exemplar steps for transforming a business model of an ongoing enterprise. In step 800, multiple business models are defined using a business model tool executed by a computer. As described in further detail above, each of the multiple business models can be based on interrelated business strategy, business goal and business constraint data, and can include a business service. Furthermore, the multiple business models can include a current business model representing a current operation of the enterprise. In step 802 an evaluation routine is run on a computer to evaluate the defined business models, and to determine business service leverage as between the current business model and another one of the multiple business models. In step 804, a model optimization is run on a computer to optimize at least one of the multiple business models based at least in part on the determined business service leverage. The enterprise is operated in accordance with the optimized business model in step 806. It is anticipated that the exemplar implementation of the integrated framework described in FIG. 8 can be modified within the scope of the present disclosure to include additional or fewer steps.

Figure 9:
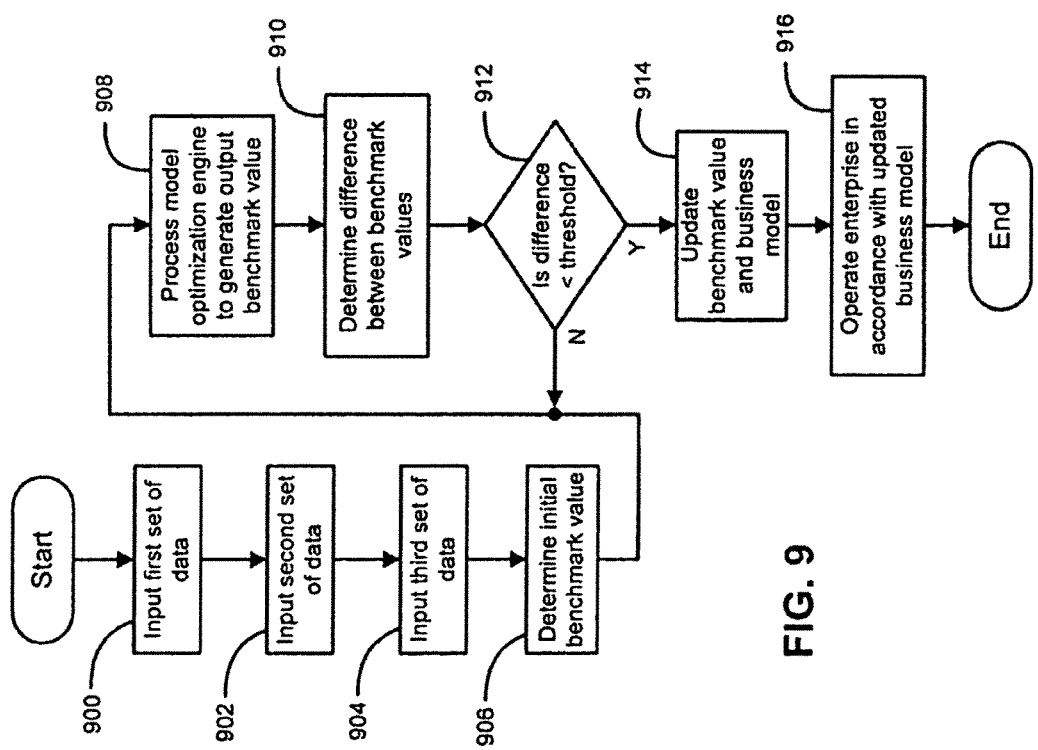
FIG. 9 is a flowchart illustrating exemplar steps that can be executed by still another implementation of integrated framework of the present disclosure.

Referring now to FIG. 9, exemplar steps that can be executed by another implementation of integrated framework of the present disclosure will, be described. In the implementation of FIG. 9, the flowchart illustrates exemplar steps for developing an optimized business model for an enterprise. In step 900, a first set of data representing a business strategy, a business goal and a constraint is input into a computer. In step 902, a second set of data representing relationships between the input business strategy, business goal and constraint is input into the computer. In step 904, a third set of data is input into the computer to define a business model that includes at least one resource. An initial benchmark value for the resource is determined in step 906. In step 908, a model optimization engine resident in the computer is processed based on the defined business model, the input business strategy, business goal and constraint to generate an output benchmark value. In step 910, a difference between the benchmark values (e.g., the difference between the initial/updated benchmark value and the output benchmark value). In step 912, the difference is compared to a threshold difference. If the difference is not less than the threshold difference, the flowchart loops back to step 908. If the difference is less than the threshold difference, benchmark value is updated based on the output benchmark value, and the defined business model is updated in step 914. In step 916, the enterprise is operated in accordance with the updated business model. It is anticipated that the exemplar implementation of the integrated framework described in FIG. 9 can be modified within the scope of the present disclosure to include additional or fewer steps.

The model-based business transformation (MBT) integrated framework of the present disclosure provides an enterprise with a tool for identifying business and I/T components, services and assets inside and outside of the enterprise, and to define the relationships between these. This enables a strategy planning cycle using a model-based approach that can be used outside for operationalizing, monitoring, analysis, and governance. As described above, each of the business and I/T components can be parameterized with performance and capability levels with both industry benchmarks and historical operational data. This data can be used for pre- and post-operationalization analysis using reporting, monitoring, and optimization techniques. This capability enables executive management to predict future business performance based on past industry benchmarks and historical data prior to executing the business model(s) and strategy. Further, upon execution, the available actual performance data can be fed into the business model(s) for continuous monitoring, and improvement of business performance towards defined goals and targets.

By parameterizing the business model(s), and driving the business model using strategies with goals and objectives, a goal-oriented transformation of business and I/T components can be planned, monitored, and governed. Further, the integrated framework can support multiple simultaneous business models that leverage reusability of services and assets across the enterprise, as well as extended partner relationships. In addition, the business model(s) are developed through multiple perspectives so that business, I/T, and finance are aligned in business transformation towards well-defined business performance goals. The business performance goals are planned, optimized, and monitored using a combination of software components, mathematical models~information models, and business techniques.

The integrated framework of the present disclosure further supports the ability to model multiple simultaneous business models that can be operationalized. These models can share services in the business services portfolio, and, in turn, can share costs. These multiple business models can also be monitored at an aggregate level using an executive dashboard. Reusability and shared costs can be optimized across the business models with a comprehensive performance analytics and optimization engine.

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A method for operating an enterprise in accordance with an optimized enterprise-level business model including optimizing a computer resource's capacity to reduce data throughput delay and increase throughput of bottleneck operations, said method comprising:
    processing, by a processor of a computer system, a model optimization engine resident in the computer system based on an enterprise-level business model, a business strategy, a business goal, and a constraint to iteratively generate an output benchmark value, to update an initial benchmark value for a resource of an enterprise based on the output benchmark value, and to update the enterprise-level business model;
    iteratively processing, by the processor, the model optimization engine based on the updated benchmark value and model, until updating the benchmark value involves changing the benchmark value by less than a predetermined benchmark value error threshold to generate the optimized enterprise-level business model;
    operating, by the processor, the enterprise in accordance with the optimized enterprise-level business model, said operating the enterprise in accordance with the optimized enterprise-level business model including:
        generating, in real time by the processor, performance measures of usage of a computer resource used by the computer system executing a business process of the enterprise;
        dynamically displaying, in real time on the computer display device, a dashboard of the performance measures of the computer resource's usage during said executing the business process;
        determining, by the processor from the performance measures displayed on the dashboard, that the computer resource is a current bottleneck or is likely to become a bottleneck in the near future; and
        optimizing the computer resource's usage, by the processor using the performance measures displayed on the dashboard, to reduce data throughput delay and increase throughput of bottleneck operations during said executing the business process, wherein said optimizing the computer resource's usage comprises modifying the computer system to make the computer system work more efficiently, use fewer resources, or both work more efficiently and use fewer resources.

2. The method of claim 1, wherein the enterprise-level business model comprises an enterprise component, a customer component and a partner component and provides a structure of services within the enterprise defining relationships with customers, partners and vendors, said enterprise component comprising one or more business components that provide business services and that are associated with business processes and service performance indicators (SPIs), said enterprise-level business model being defined based on interrelated business strategy, business goal and business constraint data, wherein the business strategy comprises one or more strategic intents that provide one or more strategic goals to be achieved by the enterprise.

3. The method of claim 1, said method further comprising:
    monitoring, by the processor in real time, metrics of the enterprise at a service level to dynamically determine, in real time, a real-time performance value of a business service.

4. The method of claim 3, wherein the metrics indicate compliance with one or more service level agreements (SLAs) between the enterprise and at least one of the customers, partners and vendors as a result of operation of the enterprise in accordance with the enterprise-level business model.

5. The method of claim 3, wherein the real-time performance value is based on service performance indicators (SPIs) and key performance indicators (KPIs) relating to the business strategy and objectives.

6. The method of claim 1, said method further comprising:
    defining an interrelated business strategy based on user input related to at least one of a goal of enterprise, a market within which the enterprise competes, and activities involved in the markets, and factors that affect the enterprise's ability to compete in the market.

7. The method of claim 1, said method further comprising:
    providing a business service portfolio that describes available business services, as well as the current and potential capacity of each, wherein the enterprise-level business model is also defined based on the business service portfolio.

8. A computer program product, comprising a computer readable storage device having computer readable program code stored therein, said storage device not being a signal, said program code containing instructions executable by a processor of a computer system to implement a method for operating an enterprise in accordance with an optimized enterprise level business model including optimizing a computer resource's capacity to reduce data throughput delay and increase throughput of bottleneck operations, said method comprising:
    processing, by the processor, a model optimization engine resident in the computer system based on an enterprise-level business model, a business strategy, a business goal, and a constraint to iteratively generate an output benchmark value, to update an initial benchmark value for a resource of an enterprise based on the output benchmark value, and to update the enterprise-level business model;

iteratively processing, by the processor, the model optimization engine based on the updated benchmark value and model, until updating the benchmark value involves changing the benchmark value by less than a predetermined benchmark value error threshold to generate the optimized enterprise-level business model;

operating, by the processor, the enterprise in accordance with the optimized enterprise-level business model, said operating the enterprise in accordance with the optimized enterprise-level business model including:

generating, in real time by the processor, performance measures of usage of a computer resource used by the computer system executing a business process of the enterprise;

dynamically displaying, in real time on the computer display device, a dashboard of the performance measures of the computer resource's usage during said executing the business process;

determining, by the processor from the performance measures displayed on the dashboard, that the computer resource is a current bottleneck or is likely to become a bottleneck in the near future; and optimizing the computer resource's usage, by the processor using the performance measures displayed on the dashboard, to reduce data throughput delay and increase throughput of bottleneck operations during said executing the business process, wherein said optimizing the computer resource's usage comprises modifying the computer system to make the computer system work more efficiently, use fewer resources, or both work more efficiently and use fewer resources.

9. The computer program product of claim 8, wherein the enterprise-level business model comprises an enterprise component, a customer component and a partner component and provides a structure of services within the enterprise defining relationships with customers, partners and vendors, said enterprise component comprising one or more business components that provide business services and that are associated with business processes and service performance indicators (SPIs), said enterprise-level business model being defined based on interrelated business strategy, business goal and business constraint data, wherein the business strategy comprises one or more strategic intents that provide one or more strategic goals to be achieved by the enterprise.

10. The computer program product of claim 8, said method further comprising:

monitoring, by the processor in real time, metrics of the enterprise at a service level to dynamically determine, in real time, a real-time performance value of a business service.

11. The computer program product of claim 10, wherein the metrics indicate compliance with one or more service level agreements (SLAs) between the enterprise and at least one of the customers, partners and vendors as a result of operation of the enterprise in accordance with the enterprise-level business model.

12. The computer program product of claim 10, wherein the real-time performance value is based on service performance indicators (SPIs) and key performance indicators (KPIs) relating to the business strategy and objectives.

13. The computer program product of claim 8, said method further comprising:

defining an interrelated business strategy based on user input related to at least one of a goal of enterprise, a market within which the enterprise competes, and activities involved in the markets, and factors that affect the enterprise's ability to compete in the market.

14. The computer program product of claim 8, said method further comprising:

providing a business service portfolio that describes available business services, as well as the current and potential capacity of each, wherein the enterprise-level business model is also defined based on the business service portfolio.

15. A method for optimizing a computer resource's capacity to reduce data throughput delay and increase throughput of bottleneck operations, said method comprising:

generating, in real time by the processor of a computer system, performance measures of usage of the computer resource used by the computer system executing a business process of an enterprise;

dynamically displaying, by the processor in real time on the computer display device, a dashboard of the performance measures of the computer resource's usage during said executing the business process;

ascertaining, by the processor from the performance measures displayed on the dashboard, that the computer resource is a current bottleneck or is likely to become a bottleneck in the near future; and optimizing the computer resource's usage, by the processor using the performance measures displayed on the dashboard, to reduce data throughput delay and increase throughput of bottleneck operations during said executing the business process, wherein said optimizing the computer resource's usage comprises modifying the computer system to make the computer system work more efficiently, use fewer resources, or both work more efficiently and use fewer resources.

16. The method of claim 15, said method further comprising prior to said generating performance measures:

operating, by the processor, the enterprise in accordance with an optimized enterprise-level business model, said operating the enterprise in accordance with the optimized enterprise-level business model including said generating performance measures, said dynamically displaying the dashboard, said ascertaining, and said optimizing.

17. The method of claim 16, said method further comprising prior to said operating the enterprise in accordance with the optimized enterprise-level business model:

processing, by the processor, a model optimization engine resident in the computer system based on an enterprise-level business model, a business strategy, a business goal, and a constraint to iteratively generate an output benchmark value, to update an initial benchmark value for a resource of an enterprise based on the output benchmark value, and to update the enterprise-level business model;

iteratively processing, by the processor, the model optimization engine based on the updated benchmark value and model, until updating the benchmark value involves changing the benchmark value by less than a predetermined benchmark value error threshold to generate the optimized enterprise-level business model.

18. The method of claim 15, said method further comprising:
- defining an interrelated business strategy based on user input related to at least one of a goal of enterprise, a market within which the enterprise competes, and activities involved in the markets, and factors that affect the enterprise's ability to compete in the market.

19. The method of claim 15, said method further comprising:
- providing a business service portfolio that describes available business services, as well as the current and potential capacity of each, wherein the enterprise-level business model is also defined based on the business service portfolio.

20. The method of claim 15, said method further comprising:
- monitoring, by the processor in real time, metrics of the enterprise at a service level to dynamically determine, in real time, a real-time performance value of a business service.

\* \* \* \* \*